United States Patent
Chen et al.

(10) Patent No.: US 8,786,962 B2
(45) Date of Patent: Jul. 22, 2014

(54) PHOTOGRAPHING SYSTEM

(75) Inventors: Chun-Shan Chen, Taichung (TW); Hsiang-Chi Tang, Taichung (TW); Po-Lun Hsu, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 51 days.

(21) Appl. No.: 13/593,490

(22) Filed: Aug. 23, 2012

(65) Prior Publication Data

US 2013/0114151 A1 May 9, 2013

(30) Foreign Application Priority Data

Nov. 7, 2011 (TW) .............................. 100140534 A

(51) Int. Cl.
*G02B 3/02* (2006.01)
*G02B 13/18* (2006.01)
*G02B 9/60* (2006.01)
*G02B 13/00* (2006.01)

(52) U.S. Cl.
CPC .............. *G02B 13/0045* (2013.01); *G02B 9/60* (2013.01); *G02B 13/18* (2013.01)
USPC ............................ 359/714; 359/766; 359/708

(58) Field of Classification Search
USPC ................. 359/656–659, 676, 677, 680–682, 359/708–718, 745, 746, 749–797
See application file for complete search history.

(56) References Cited

U.S. PATENT DOCUMENTS

| | | | |
|---|---|---|---|
| 7,710,665 B2 * | 5/2010 | Park et al. ..................... | 359/767 |
| 7,969,664 B2 | 6/2011 | Tang et al. | |
| 8,000,030 B2 | 8/2011 | Tang | |
| 8,000,031 B1 | 8/2011 | Tsai | |
| 8,072,695 B1 * | 12/2011 | Lee et al. ...................... | 359/764 |
| 8,179,615 B1 * | 5/2012 | Tang et al. .................... | 359/714 |
| 8,456,758 B1 * | 6/2013 | Huang et al. .................. | 359/714 |
| 8,508,836 B2 * | 8/2013 | Ohtsu ........................... | 348/340 |
| 8,593,739 B2 * | 11/2013 | Ise et al. ........................ | 359/714 |
| 2010/0220229 A1 * | 9/2010 | Sano ............................. | 348/340 |
| 2010/0254029 A1 * | 10/2010 | Shinohara .................... | 359/764 |
| 2011/0176049 A1 * | 7/2011 | Hsieh et al. ................... | 348/340 |
| 2012/0075721 A1 * | 3/2012 | Konishi et al. ................ | 359/708 |
| 2013/0201568 A1 * | 8/2013 | Tsai et al. ..................... | 359/714 |

FOREIGN PATENT DOCUMENTS

| | | |
|---|---|---|
| TW | 200903024 | 1/2009 |
| TW | 201126197 | 8/2011 |
| TW | 201135304 | 10/2011 |

* cited by examiner

*Primary Examiner* — Thomas K Pham
*Assistant Examiner* — Nicholas Pasko
(74) *Attorney, Agent, or Firm* — CKC & Partners Co., Ltd.

(57) ABSTRACT

A photographing system includes, in order from an object side to an image side, a first lens element, a second lens element, a third lens element, a fourth lens element and a fifth lens element. The first lens element with positive refractive power has a convex object-side surface. The second lens element has negative refractive power. The third lens element with positive refractive power is made of plastic material and has a convex object-side surface and a convex image-side surface. The fourth lens element with negative refractive power is made of plastic material and has a concave object-side surface and a convex image-side surface. The fifth lens element with refractive power is made of plastic material and has a concave image-side surface, wherein the fifth lens element has at least one inflection point. The object-side surfaces and the image-side surfaces of the third through fifth lens elements are aspheric.

17 Claims, 18 Drawing Sheets

PHOTOGRAPHING SYSTEM

RELATED APPLICATIONS

The application claims priority to Taiwan Application Serial Number 100140534, filed Nov. 7, 2011, which is herein incorporated by reference.

BACKGROUND

1. Technical Field

The present invention relates to a photographing system. More particularly, the present invention relates to a compact photographing system applicable to electronic products.

2. Description of Related Art

In recent years, with the popularity of mobile products with camera functionalities, the demand for miniaturizing a photographing system is increasing. The sensor of a conventional photographing camera is typically a CCD (Charge-Coupled Device) image sensor or a CMOS (Complementary Metal-Oxide-Semiconductor) sensor. As advanced semiconductor manufacturing technologies have allowed the pixel size of sensors to be reduced and compact photographing systems have gradually evolved toward the field of higher megapixels, there is an increasing demand for compact photographing systems featuring better image quality.

A conventional compact photographing system employed in a portable electronic product mainly adopts a four-element lens structure. Due to the popularity of mobile products with high specification, such as smart phones and PDAs (Personal Digital Assistants), the pixel and image-quality requirements of the compact photographing system have increased rapidly. However, the conventional four-piece lens structure cannot satisfy the requirements of the compact photographing system.

A conventional compact photographing system utilizes fifth-element lens structure for enhancing the image quality and resolution of the photographing system, but the photographing system has a fourth lens element with a concave image-side surface. The outer diameters of the fourth lens element and the fifth lens element would be increased and the total track length of the photographing system would also be increased by such arrangement, so that the compact size demand would be restricted. Therefore, a need exists in the art for providing a photographing system for use in a mobile electronic product that has excellent imaging quality without an excessive total track length.

SUMMARY

According to one aspect of the present disclosure, a photographing system includes, in order from an object side to an image side, a first lens element, a second lens element, a third lens element, a fourth lens element and a fifth lens element. The first lens element with positive refractive power has a convex object-side surface. The second lens element has negative refractive power. The third lens element with positive refractive power is made of plastic material and has a convex object-side surface and a convex image-side surface, wherein the object-side surface and the image-side surface of the third lens element are aspheric. The fourth lens element with negative refractive power is made of plastic material and has a concave object-side surface and a convex image-side surface, wherein the object-side surface and the image-side surface of the fourth lens element are aspheric. The fifth lens element with refractive power is made of plastic material and has a concave image-side surface, wherein an object-side surface and the image-side surface of the fifth lens element are aspheric, and the fifth lens element has at least one inflection point formed on at least one of the object-side surface and the image-side surface thereof. When a curvature radius of the object-side surface of the third lens element is R5, a curvature radius of the image-side surface of the third lens element is R6, an axial distance between the object-side surface of the first lens element and the image-side surface of the fifth lens element is Td, and a central thickness of the fifth lens element is CT5, the following relationships are satisfied:

$$-4.5 < R5/R6 < -1.0;\ \text{and}$$

$$2.0 < Td/CT5 < 4.4.$$

According to another aspect of the present disclosure, a photographing system includes, in order from an object side to an image side, a first lens element, a second lens element, a third lens element, a fourth lens element and a fifth lens element. The first lens element with positive refractive power has a convex object-side surface. The second lens element has negative refractive power. The third lens element with positive refractive power is made of plastic material and has a convex object-side surface and a convex image-side surface, wherein the object-side surface and the image-side surface of the third lens element are aspheric. The fourth lens element with negative refractive power is made of plastic material and has a concave object-side surface and a convex image-side surface, wherein the object-side surface and the image-side surface of the fourth lens element are aspheric. The fifth lens element with refractive power is made of plastic material has a concave image-side surface, wherein an object-side surface and the image-side surface of the fifth lens element are aspheric, and the fifth lens element has at least one inflection point formed on at least one of the object-side surface and the image-side surface thereof. When a curvature radius of the object-side surface of the third lens element is R5, a curvature radius of the image-side surface of the third lens element is R6, an Abbe number of the third lens element is V3, and an Abbe number of the fourth lens element is V4, the following relationships are satisfied:

$$-5.5 < R5/R6 < 0.0;\ \text{and}$$

$$30 < V3 - V4 < 45.$$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
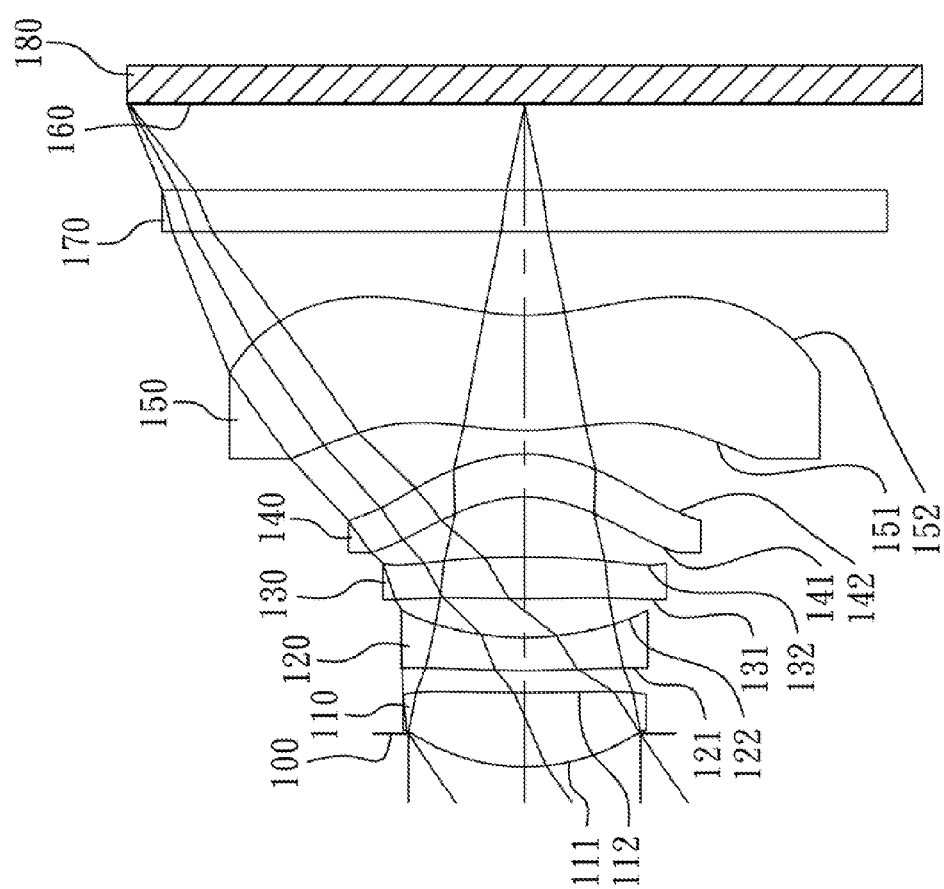
FIG. 1 is a schematic view of a photographing system according to the 1st embodiment of the present disclosure.

A photographing system includes, in order from an object side to an image side, a first lens element, a second lens element, a third lens element, a fourth lens element and a fifth lens element. The photographing system further includes an image sensor located on an image plane.

The first lens element with positive refractive power has a convex object-side surface, so that the total track length of the photographing system can be reduced by adjusting the positive refractive power of the first lens element.

The second lens element with negative refractive power corrects the aberration generated from the first lens element with positive refractive power.

The third lens element with positive refractive power has a convex object-side surface and a convex image-side surface. Therefore, the sensitivity of the photographing system can be reduced by distributing the positive refractive power of the first lens element. The third lens element is made of plastic material which can reduce the cost of manufacture.

The fourth lens element with negative refractive power has a concave object-side surface and a convex image-side surface, so that the astigmatism of the photographing system can be corrected. The fourth lens element is made of plastic material which can reduce the cost of manufacture.

The fifth lens element with refractive power can have a concave image-side surface and a convex object-side surface, so that the principal point of the photographing system can be positioned away from the image plane, and the total track length of the photographing system can be reduced so as to maintain the compact size of the photographing system. Furthermore, the shape of the surfaces of the fifth lens element can correct the high order aberration of the photographing system while retaining the image quality. The fifth lens element is made of plastic material which can reduce the cost of manufacture. Moreover, the fifth lens element has at least one inflection point formed on at least one of the object-side surface and the image-side surface thereof. Therefore, the incident angle of the off-axis field on the image sensor can be effectively minimized and the aberration can be corrected as well.

When a curvature radius of the object-side surface of the third lens element is $R5$, and a curvature radius of the image-side surface of the third lens element is $R6$, the following relationship is satisfied:

$$-5.5 < R5/R6 < 0.0.$$

Therefore, the positive refractive power of the third lens element can be adjusted by the curvature radius of the object-side surface and the image-side surface of the third lens element, so that the sensitivity of the photographing system can be reduced.

$R5$ and $R6$ can further satisfy the following relationship:

$$-4.5 < R5/R6 < -1.0.$$

Moreover, $R5$ and $R6$ satisfy the following relationship:

$$-3.5 < R5/R6 < -1.3.$$

When an axial distance between the object-side surface of the first lens element and the image-side surface of the fifth lens element is $Td$, and a central thickness of the fifth lens element is $CT5$, the following relationship is satisfied:

$$2.0 < Td/CT5 < 4.4.$$

By foregoing arrangement, the distance between the first lens element and the fifth lens element and the thickness of the fifth lens element are proper, so that the fabrication and manufacture of the lens elements are easier and the yield of the manufacture of the photographing system can be increased. Furthermore, the total track length of the photographing system can be reduced so as to maintain the compact size of the photographing system.

When a curvature radius of the object-side surface of the fourth lens element is $R7$, and a focal length of the photographing system is f, the following relationship is satisfied:

$$-0.5 < R7/f < 0.$$

Therefore, the Petzval Sum and the aberration of the photographing system can be reduced by adjusting the curvature of the object-side surface of the fourth lens element, and the resolution power thereof can be enhanced.

When a central thickness of the fourth lens element is $CT4$, and the central thickness of the fifth lens element is $CT5$, the following relationship is satisfied:

$$2.4 < CT5/CT4 < 4.5.$$

Therefore, the fabrication and the manufacture of the lens elements can be easier for increasing yield rate of the photographing system and the proper thickness of the lens elements can avoid the problem during injection molding of the plastic lens elements such as broken or bad molds for ensuring the quality of the photographing system. Furthermore, the total track length and the thickness of the lens elements would be proper, so as to maintain the compact size of the photographing system for portable electronic products.

When the Abbe number of the third lens element is $V3$, and the Abbe number of the fourth lens element is $V4$, the following relationship is satisfied:

$$30 < V3 - V4 < 45.$$

Therefore, the chromatic aberration of the photographing system can be corrected.

When the focal length of the photographing system is f, a focal length of the third lens element is $f3$, a focal length of the fourth lens element is f4, and a focal length of the fifth lens element is f5, the following relationship is satisfied:

$$0.5 < f/f3 + |f/f4| + |f/f5| < 1.6.$$

Therefore, the refractive power of the third through fifth lens elements can correct the aberration of the photographing system and reduce the sensitivity thereof.

When a curvature radius of the object-side surface of the first lens element is R1, and a curvature radius of an image-side surface of the first lens element is R2, the following relationship is satisfied:

$$-3.0 < (R1+R2)/(R1-R2) < -0.7.$$

Therefore, the spherical aberration of the photographing system can be corrected by controlling the positive refractive power of the first lens element.

When an axial distance between the object-side surface of the first lens element and an image plane is TTL, and a maximum image height of the photographing system is ImgH, the following relationship is satisfied:

$$TTL/ImgH < 1.80.$$

Therefore, the total track length of the photographing system can be reduced so as to maintain the compact size of the photographing system for portable electronic products.

According to the photographing system of the present disclosure, the lens elements thereof can be made of plastic material or glass. When the lens elements are made of glass material, the allocation of the refractive power of the photographing system may be more flexible and easier to design. When the lens elements are made of plastic material, the cost of manufacture can be effectively reduced. Furthermore, the surface of each lens element can be aspheric, so that it is easier to make the surface into non-spherical shapes. As a result, more controllable variables are obtained, and the aberration is reduced, and the number of required lens elements can be reduced while constructing an optical system. Therefore, the total track length of the photographing system can also be reduced.

According to the photographing system of the present disclosure, when the lens element has a convex surface, it indicates that the paraxial region of the surface is convex; and when the lens element has a concave surface, it indicates that the paraxial region of the surface is concave.

According to the photographing system of the present disclosure, the photographing system can include at least one stop such as a glare stop or a field stop, for reducing stray light while retaining high image quality. Furthermore, when the stop is an aperture stop, the position of the aperture stop within an optical system can be arbitrarily placed in front of the entire optical system, within the optical system, or in front of the image plane in accordance with the preference of the optical designer, in order to achieve the desirable optical features or higher image quality produced from the optical system.

According to the above description of the present disclosure, the following 1st-9th specific embodiments are provided for further explanation.

1st Embodiment

Figure 2:
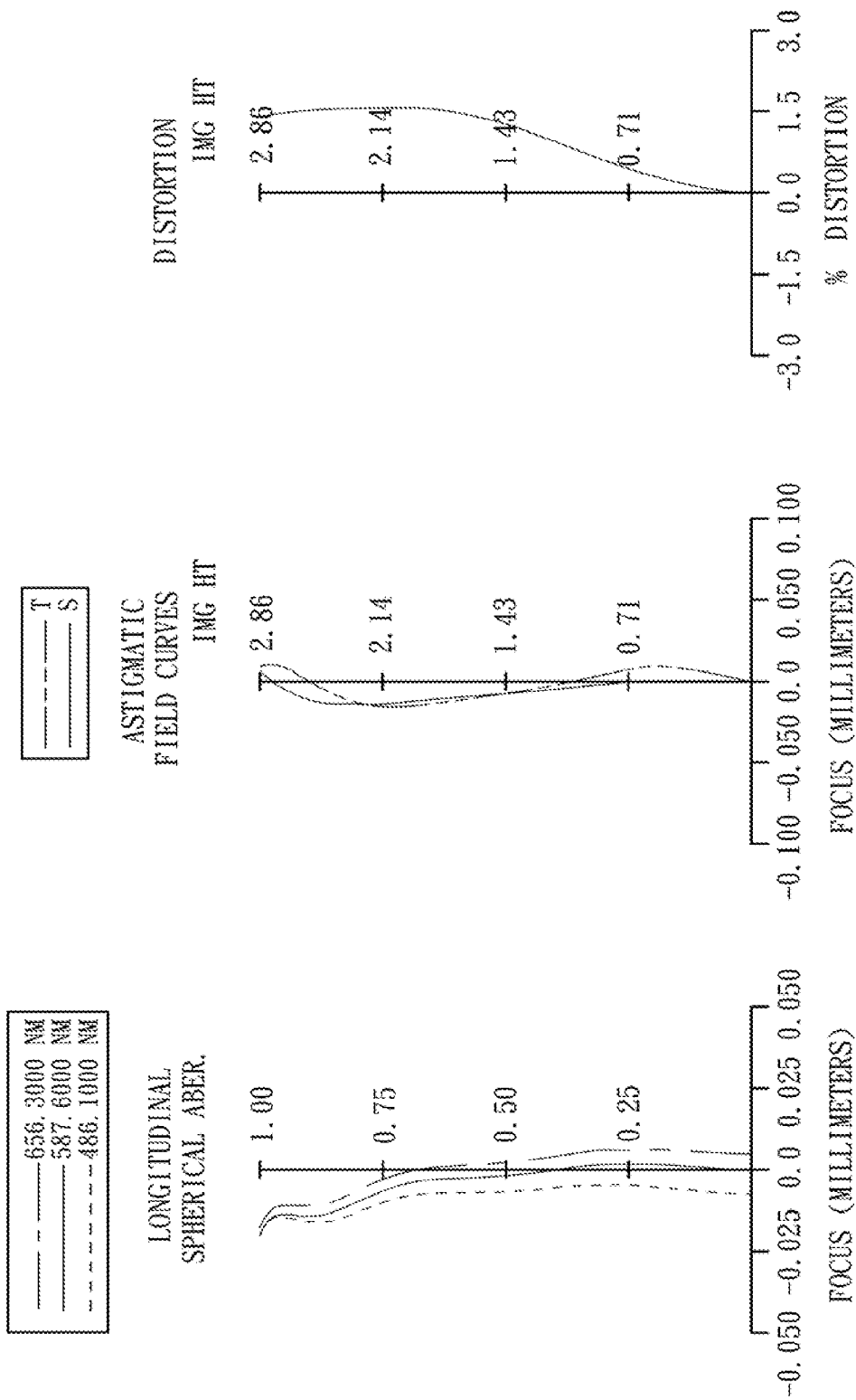
FIG. 2 shows spherical aberration curves, astigmatic field curves and a distortion curve of the photographing system according to the 1st embodiment.

FIG. 1 is a schematic view of a photographing system according to the 1st embodiment of the present disclosure. FIG. 2 shows spherical aberration curves, astigmatic field curves and a distortion curve of the photographing system according to the 1st embodiment. In FIG. 1, the photographing system includes, in order from an object side to an image side, an aperture stop 100, the first lens element 110, the second lens element 120, the third lens element 130, the fourth lens element 140, the fifth lens element 150, an IR-filter 170, an image plane 160 and an image sensor 180.

The first lens element 110 with positive refractive power has a convex object-side surface 111 and a concave image-side surface 112, and is made of plastic material. The object-side surface 111 and the image-side surface 112 of the first lens element 110 are aspheric.

The second lens element 120 with negative refractive power has a convex object-side surface 121 and a concave image-side surface 122, and is made of plastic material. The object-side surface 121 and the image-side surface 122 of the second lens element 120 are aspheric.

The third lens element 130 with positive refractive power has a convex object-side surface 131 and a convex image-side surface 132, and is made of plastic material. The object-side surface 131 and the image-side surface 132 of the third lens element 130 are aspheric.

The fourth lens element 140 with negative refractive power has a concave object-side surface 141 and a convex image-side surface 142, and is made of plastic material. The object-side surface 141 and the image-side surface 142 of the fourth lens element 140 are aspheric.

The fifth lens element 150 with negative refractive power has a convex object-side surface 151 and a concave image-side surface 152, and is made of plastic material. The object-side surface 151 and the image-side surface 152 of the fifth lens element 150 are aspheric. Furthermore, the fifth lens element 150 has inflection points formed on the object-side surface 151 and the image-side surface 152 thereof.

The IR-filter 170 is made of glass and located between the fifth lens element 150 and the image plane 160, and will not affect the focal length of the photographing system.

The equation of the aspheric surface profiles of the aforementioned lens elements of the 1st embodiment expressed as follows $$X(Y) = (Y^2/R)/\left(1 + sqrt\left(1 - (1+k) \times (Y/R)^2\right)\right) + \sum_i (Ai) \times (Y^i)$$

where:

X is the distance between a point on the aspheric surface spaced at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the photographing system according to the 1st embodiment, when a focal length of the photographing system is f, an f-number of the photographing system is Fno, and a half of the maximal field of view is HFOV, these parameters have the following values:

f=4.12 mm;

Fno=2.46; and

HFOV=34.4 degrees.

In the photographing system according to the 1st embodiment, when the Abbe number of the third lens element 130 is V3, and the Abbe number of the fourth lens element 140 is V4, the following relationship is satisfied:

$$V3-V4=32.6.$$

In the photographing system according to the 1st embodiment, when a central thickness of the fourth lens element 140 is CT4, and the central thickness of the fifth lens element 150 is CT5, the following relationship is satisfied:

$$CT5/CT4=2.69.$$

In the photographing system according to the 1st embodiment, when a curvature radius of the object-side surface 111 of the first lens element 110 is R1, and a curvature radius of an image-side surface 112 of the first lens element 110 is R2, a curvature radius of the object-side surface 131 of the third lens element 130 is R5, a curvature radius of the image-side surface 132 of the third lens element 130 is R6, a curvature radius of the object-side surface 141 of the fourth lens element 140 is R7, and the focal length of the photographing system is f, the following relationships are satisfied:

$$(R1+R2)/(R1-R2)=-1.30;$$

$$R5/R6=-1.90;\text{ and}$$

$$R7/f=-0.22,$$

In the photographing system according to the 1st embodiment, when the focal length of the photographing system is f, a focal length of the third lens element 130 is f3, a focal length of the fourth lens element 140 is f4, and a focal length of the fifth lens element 150 is f5, the following relationship is satisfied:

$$f/f3+|f/f4|+|f/f5|=0.90.$$

In the photographing system according to the 1st embodiment, when an axial distance between the object-side surface 111 of the first lens element 110 and the image-side surface 152 of the fifth lens element 150 is Td, and the central thickness of the fifth lens element 150 is CT5, the following relationship is satisfied:

$$Td/CT5=3.91.$$

In the photographing system according to the 1st embodiment, when an axial distance between the object-side surface 111 of the first lens element 110 and the image plane 160 is TTL, and a maximum image height of the photographing system is ImgH which here is a half of the diagonal length of the photosensitive area of the image sensor 180 on the image plane 160, the following relationship is satisfied:

$$TTL/ImgH=1.64.$$

The detailed optical data of the 1st embodiment are shown in Table 1 and the aspheric surface data are shown in Table 2 below.

TABLE 1

1st Embodiment
f = 4.12 mm, Fno = 2.46, HFOV = 34.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.236 | | | | |
| 2 | Lens 1 | 1.490210 (ASP) | 0.532 | Plastic | 1.544 | 55.9 | 3.09 |
| 3 | | 11.331100 (ASP) | 0.161 | | | | |
| 4 | Lens 2 | 5.028300 (ASP) | 0.240 | Plastic | 1.640 | 23.3 | −4.99 |
| 5 | | 1.917060 (ASP) | 0.278 | | | | |
| 6 | Lens 3 | 10.626500 (ASP) | 0.302 | Plastic | 1.544 | 55.9 | 6.77 |
| 7 | | −5.587600 (ASP) | 0.433 | | | | |
| 8 | Lens 4 | −0.888280 (ASP) | 0.310 | Plastic | 1.640 | 23.3 | −16.84 |
| 9 | | −1.099920 (ASP) | 0.174 | | | | |
| 10 | Lens 5 | 2.136920 (ASP) | 0.834 | Plastic | 1.544 | 55.9 | −96.09 |
| 11 | | 1.770660 (ASP) | 0.600 | | | | |
| 12 | IR-Filter | Plano | 0.300 | Glass | 1.517 | 64.2 | — |
| 13 | | Plano | 0.627 | | | | |
| 14 | Image | Plano | — | | | | |

Note:
Reference wavelength (d-line) is 587.6 nm.

TABLE 2

Aspheric Coefficients

| | Surface # | | | | |
|---|---|---|---|---|---|
| | 2 | 3 | 4 | 5 | 6 |
| k = | −8.82368E−02 | 1.43813E+01 | −3.08812E+01 | −9.11873E+00 | 6.23829E+00 |
| A4 = | −9.49026E−05 | −8.94813E−02 | −2.38188E−01 | −8.76965E−02 | −7.28141E−02 |
| A6 = | 1.47005E−02 | 1.11182E−01 | 4.70230E−01 | 3.63516E−01 | −1.17823E−01 |
| A8 = | −9.90199E−02 | −1.27401E−01 | −4.86212E−01 | −3.50489E−01 | 2.32438E−01 |
| A10 = | 1.88222E−01 | −7.96151E−03 | 1.84972E−01 | 1.83133E−01 | −1.37703E−02 |
| A12 = | −1.76773E−01 | 4.63379E−03 | −6.53358E−03 | −3.03684E−03 | −2.76493E−01 |
| A14 = | 1.58427E−02 | −9.53415E−03 | 1.59569E−02 | −1.27106E−02 | 3.45610E−01 |
| A16 = | | | | | −1.55630E−01 |

TABLE 2-continued

Aspheric Coefficients

| Surface # | 7 | 8 | 9 | 10 | 11 |
|---|---|---|---|---|---|
| k = | −1.00000E+02 | −3.12516E+00 | −6.03526E−01 | −1.54678E+01 | −9.23752E+00 |
| A4 = | −1.16227E−02 | 1.33181E−01 | 1.78308E−01 | −1.62775E−01 | −8.60366E−02 |
| A6 = | −1.21691E−01 | −4.13386E−01 | −1.29284E−01 | 5.33275E−02 | 2.65098E−02 |
| A8 = | 1.74021E−01 | 4.56595E−01 | 4.24394E−02 | −1.18990E−02 | −8.12000E−03 |
| A10 = | −3.38359E−02 | −1.52967E−01 | 6.03634E−02 | 1.61749E−03 | 1.56011E−03 |
| A12 = | 6.44453E−04 | 1.04527E−02 | −7.83357E−03 | 5.32732E−04 | −1.76634E−04 |
| A14 = | −1.21573E−04 | −8.71682E−03 | −2.04666E−02 | −1.68601E−04 | 7.60865E−06 |
| A16 = | | 1.12974E−03 | 5.30103E−03 | 3.27417E−06 | |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
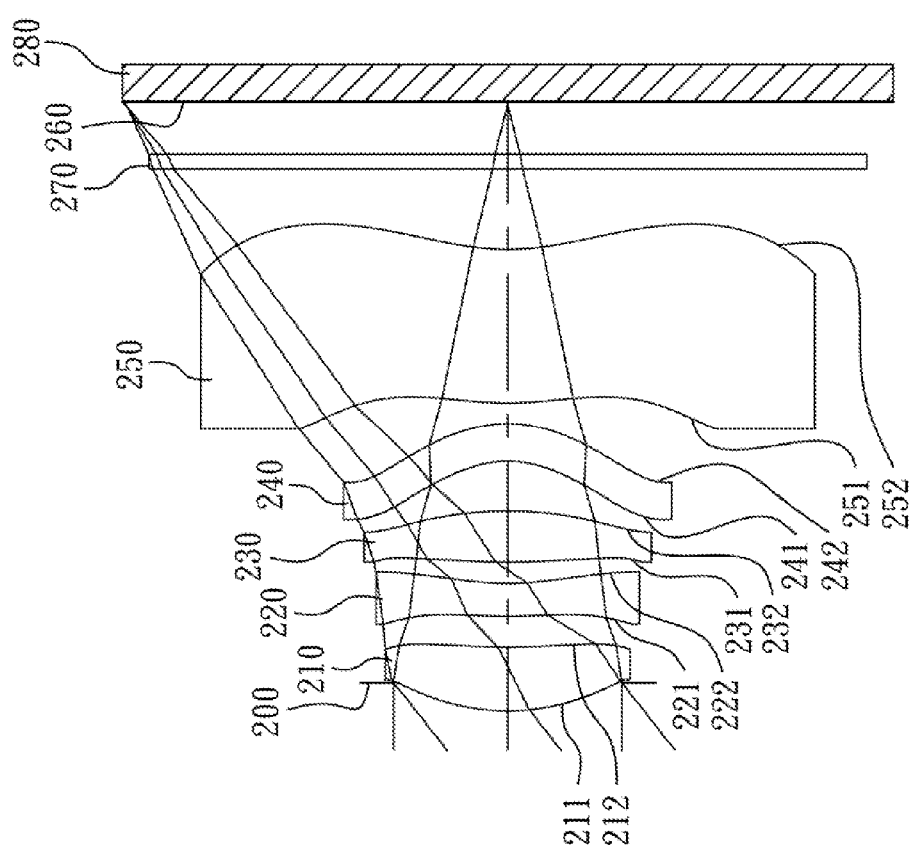
FIG. 3 is a schematic view of a photographing system according to the 2nd embodiment of the present disclosure.
Figure 4:
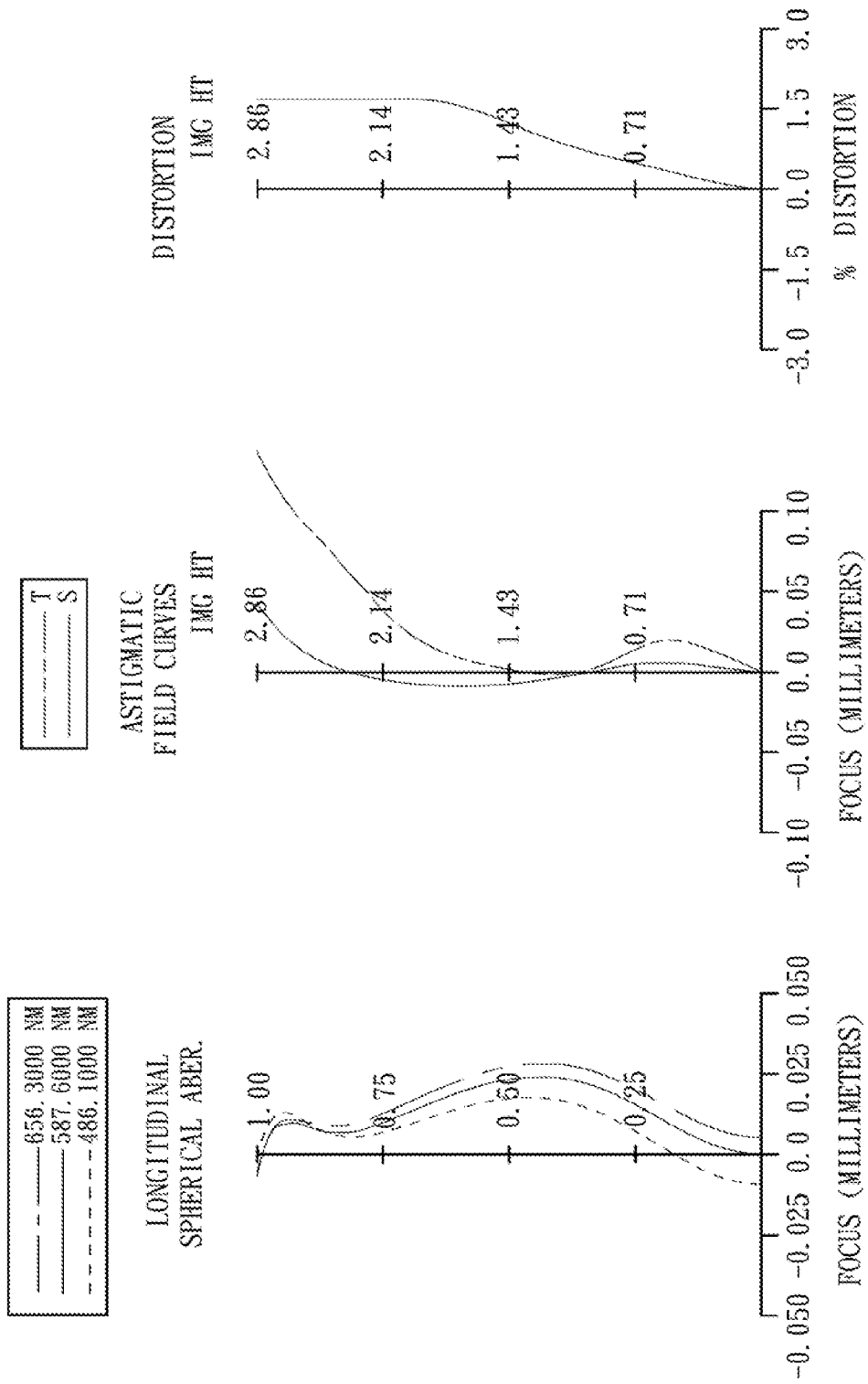
FIG. 4 shows spherical aberration curves, astigmatic field curves and a distortion curve of the photographing system according to the 2nd embodiment.

FIG. 3 is a schematic view of a photographing system according to the 2nd embodiment of the present disclosure. FIG. 4 shows spherical aberration curves, astigmatic field curves and a distortion curve of the photographing system according to the 2nd embodiment. In FIG. 3, the photographing system includes, in order from an object side to an image side, an aperture stop 200, the first lens element 210, the second lens element 220, the third lens element 230, the fourth lens element 240, the fifth lens element 250, an IR-filter 270, an image plane 260 and an image sensor 280.

The first lens element 210 with positive refractive power has a convex object-side surface 211 and a concave image-side surface 212, and is made of plastic material. The object-side surface 211 and the image-side surface 212 of the first lens element 210 are aspheric.

The second lens element 220 with negative refractive power has a convex object-side surface 221 and a concave image-side surface 222, and is made of plastic material. The object-side surface 221 and the image-side surface 222 of the second lens element 220 are aspheric.

The third lens element 230 with positive refractive power has a convex object-side surface 231 and a convex image-side surface 232, and is made of plastic material. The object-side surface 231 and the image-side surface 232 of the third lens element 230 are aspheric.

The fourth lens element 240 with negative refractive power has a concave object-side surface 241 and a convex image-side surface 242, and is made of plastic material. The object-side surface 241 and the image-side surface 242 of the fourth lens element 240 are aspheric.

The fifth lens element 250 with negative refractive power has a convex object-side surface 251 and a concave image-side surface 252, and is made of plastic material. The object-side surface 251 and the image-side surface 252 of the fifth lens element 250 are aspheric. Furthermore, the fifth lens element 250 has inflection points formed on the object-side surface 251 and the image-side surface 252 thereof.

The IR-filter 270 is made of glass and located between the fifth lens element 250 and the image plane 260, and will not affect the focal length of the photographing system.

The detailed optical data of the 2nd embodiment are shown in Table 3 and the aspheric surface data are shown in Table 4 below.

TABLE 3

2nd Embodiment
f = 3.51 mm, Fno = 2.07, HFOV = 38.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.210 | | | | |
| 2 | Lens 1 | 1.615060 (ASP) | 0.479 | Plastic | 1.544 | 55.9 | 4.17 |
| 3 | | 5.017400 (ASP) | 0.229 | | | | |
| 4 | Lens 2 | 3.585800 (ASP) | 0.240 | Plastic | 1.640 | 23.3 | −6.27 |
| 5 | | 1.843470 (ASP) | 0.160 | | | | |
| 6 | Lens 3 | 5.156200 (ASP) | 0.385 | Plastic | 1.544 | 55.9 | 3.34 |
| 7 | | −2.729010 (ASP) | 0.368 | | | | |
| 8 | Lens 4 | −0.747950 (ASP) | 0.280 | Plastic | 1.640 | 23.3 | −10.30 |
| 9 | | −0.967000 (ASP) | 0.155 | | | | |
| 10 | Lens 5 | 2.377730 (ASP) | 1.140 | Plastic | 1.544 | 55.9 | −35.42 |
| 11 | | 1.759010 (ASP) | 0.600 | | | | |
| 12 | IR-Filter | Plano | 0.110 | Glass | 1.517 | 64.2 | — |
| 13 | | Plano | 0.394 | | | | |
| 14 | Image | Plano | — | | | | |

Note:
Reference wavelength (d-line) is 587.6 nm

TABLE 4

Aspheric Coefficients

| Surface # | | | | |
|---|---|---|---|---|
| 2 | 3 | 4 | 5 | 6 |
| k = −2.04445E−01 | −1.73519E+01 | −5.19844E+01 | −1.53820E+01 | −3.28507E+01 |
| A4 = −1.41905E−02 | −1.12004E−01 | −3.36761E−01 | −1.89393E−01 | −7.43112E−02 |
| A6 = 5.18938E−02 | 1.00260E−01 | 3.87542E−01 | 2.35298E−01 | −3.12917E−02 |
| A8 = −1.57521E−01 | −1.85730E−01 | −4.79941E−01 | −1.62990E−01 | 1.72538E−01 |
| A10 = 2.12744E−01 | 4.56712E−02 | 2.73041E−01 | 4.21936E−02 | −6.21268E−02 |
| A12 = −1.79604E−01 | 3.43907E−03 | −7.06358E−03 | −6.04845E−03 | −2.77763E−01 |
| A14 = 1.00132E−02 | −1.43639E−02 | 9.19082E−03 | 1.79638E−03 | 3.45269E−01 |
| A16 = | | | | −1.53039E−01 |

| Surface # | | | | |
|---|---|---|---|---|
| 7 | 8 | 9 | 10 | 11 |
| k = −8.59775E+00 | −2.43972E+00 | −7.07720E−01 | −2.34893E+01 | −8.16902E+00 |
| A4 = −2.15200E−02 | 1.26509E−01 | 1.99509E−01 | −1.46016E−01 | −5.82103E−02 |
| A6 = −8.67092E−02 | −3.98881E−01 | −1.14438E−01 | 4.54654E−02 | 1.93389E−02 |
| A8 = 1.11515E−01 | 4.81619E−01 | 4.48622E−02 | −1.56447E−02 | −6.54035E−03 |
| A10 = 2.56327E−02 | −1.41615E−01 | 6.27502E−02 | 2.74964E−03 | 1.34373E−03 |
| A12 = −3.25574E−02 | −2.75331E−03 | −7.42890E−03 | 8.66152E−04 | −1.53336E−04 |
| A14 = 5.10174E−05 | −1.04804E−02 | −2.19820E−02 | −5.56226E−05 | 7.16877E−06 |
| A16 = | 2.44226E−03 | 5.99811E−03 | −5.24432E−05 | |

In the photographing system according to the 2nd embodiment, the definitions of f, Fno, HFOV, V3, V4, CT4, CT5, R1, R2, R5, R6, R7, f3, f4, f5, Td, TTL and ImgH are the same as those stated in the 1st embodiment with corresponding values for the 2nd embodiment. Moreover, these parameters can be calculated from Table 3 and Table 4 as the following values and satisfy the following relationships:

| | |
|---|---|
| f (mm) | 3.51 |
| Fno | 2.07 |
| HFOV (deg.) | 38.6 |
| V3 − V4 | 32.6 |
| CT5/CT4 | 4.07 |
| (R1 + R2)/(R1 − R2) | −1.95 |
| R5/R6 | −1.89 |
| R7/f | −0.21 |
| f/f3 + |f/f4| + |f/f5| | 1.49 |
| Td/CT5 | 3.01 |
| TTL/ImgH | 1.58 |

3rd Embodiment

Figure 5:
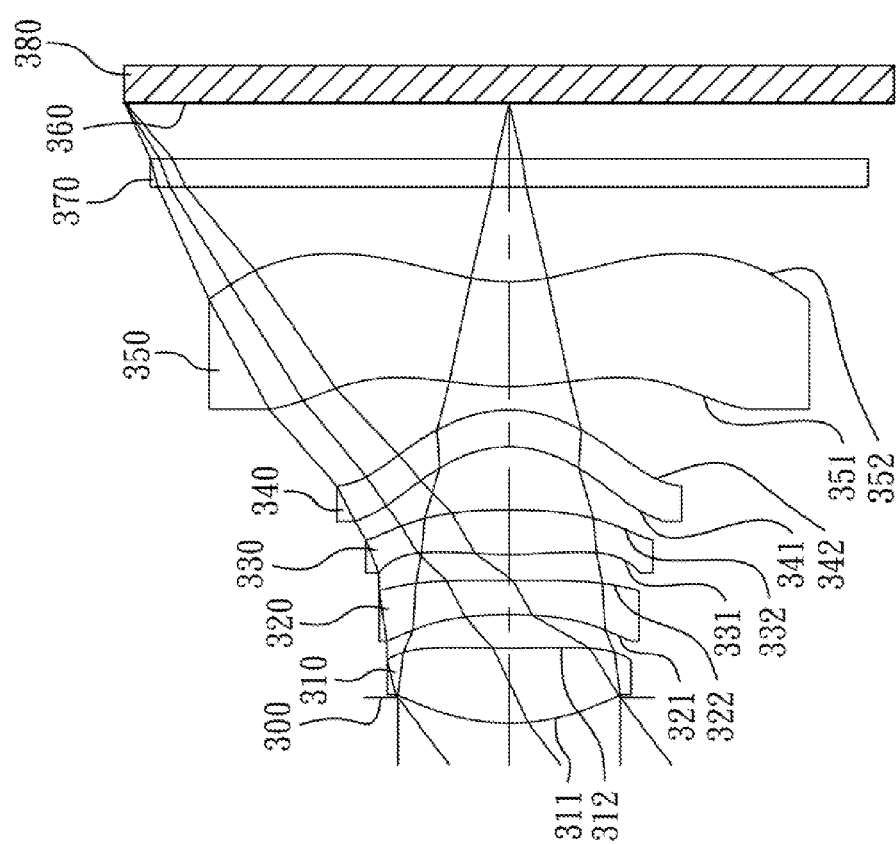
FIG. 5 is a schematic view of a photographing system according to the 3rd embodiment of the present disclosure.
Figure 6:
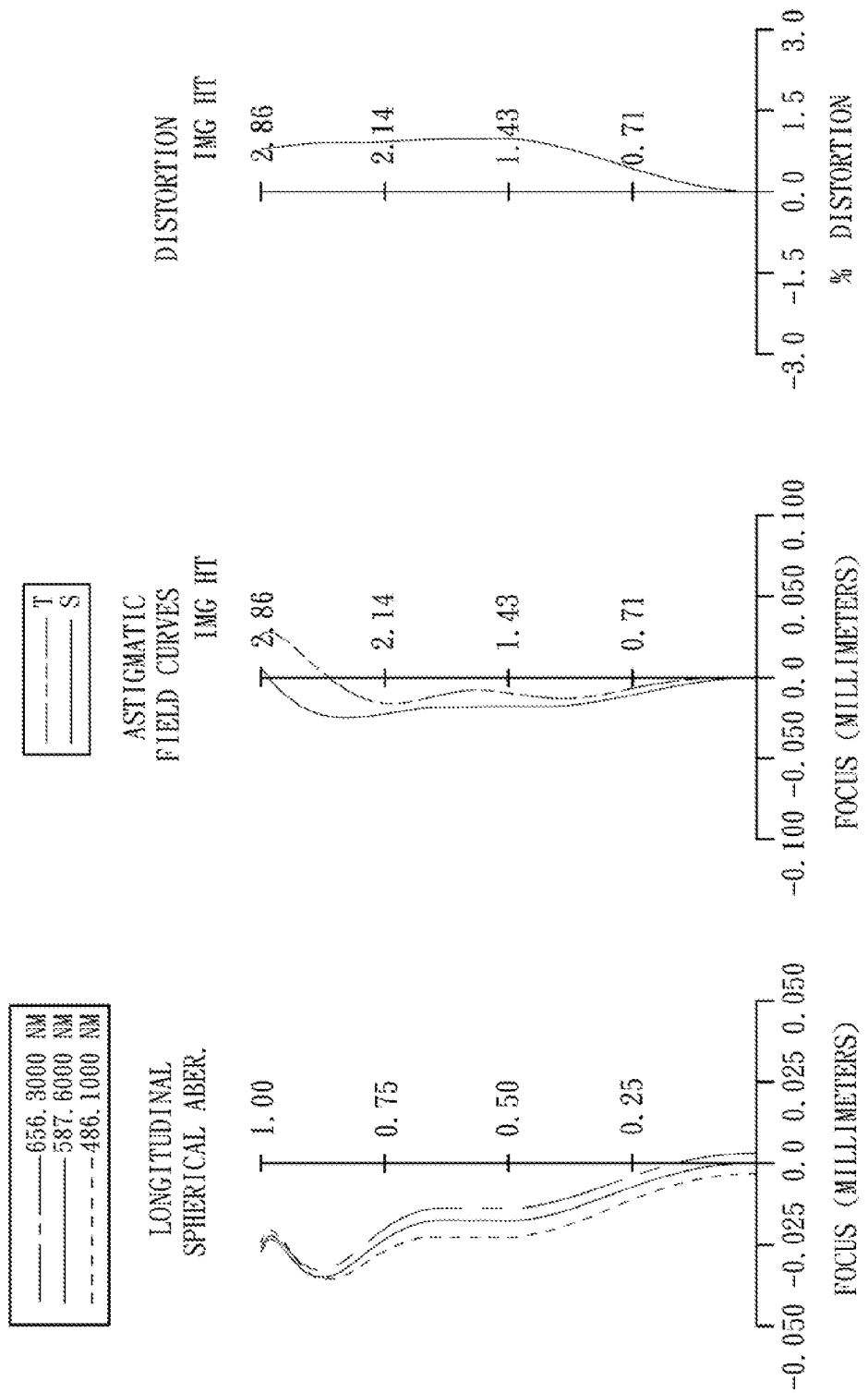
FIG. 6 shows spherical aberration curves, astigmatic field curves and a distortion curve of the photographing system according to the 3rd embodiment.

FIG. 5 is a schematic view of a photographing system according to the 3rd embodiment of the present disclosure FIG. 6 shows spherical aberration curves, astigmatic field curves and a distortion curve of the photographing system according to the 3rd embodiment. In FIG. 5, the photographing system includes, in order from an object side to an image side, an aperture stop 300, the first lens element 310, the second lens element 320, the third lens element 330, the fourth lens element 340, the fifth lens element 350, an IR-filter 370, an image plane 360 and an image sensor 380.

The first lens element 310 with positive refractive power has a convex object side surface 311 and a concave image-side surface 312, and is made of plastic material. The object-side surface 311 and the mage-side surface 312 of the first lens element 310 are aspheric.

The second lens element 320 with negative refractive power has a concave object-side surface 321 and a concave image-side surface 322, and is made of plastic material. The object-side surface 321 and the image-side surface 322 of the second lens element 320 are aspheric.

The third lens element 330 with positive refractive power has a convex object-side surface 331 and a convex image-side surface 332, and is made of plastic material. The object-side surface 331 and the image-side surface 332 of the third lens element 330 are aspheric.

The fourth lens element 340 with negative refractive power has a concave object-side surface 341 and a convex image-side surface 342, and is made of plastic material. The object-side surface 341 and the image-side surface 342 of the fourth lens element 340 are aspheric.

The fifth lens element 350 with negative refractive power has a convex object-side surface 351 and a concave image-side surface 352, and is made of plastic material. The object-side surface 351 and the image-side surface 352 of the fifth lens element 350 are aspheric. Furthermore, the fifth lens element 350 has inflection points formed on the object-side surface 351 and the image-side surface 352 thereof.

The IR-filter 370 is made of glass and located between the fifth lens element 350 and the image plane 360, and will not affect the focal length of the photographing system.

The detailed optical data of the 3rd embodiment are shown in Table 5 and the aspheric surface data are shown in Table 6 below.

TABLE 5

3rd Embodiment
f = 3.71 mm, Fno = 2.25, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.190 | | | | |
| 2 | Lens 1 | 1.630550 (ASP) | 0.560 | Plastic | 1.544 | 55.9 | 3.34 |
| 3 | | 14.033100 (ASP) | 0.249 | | | | |
| 4 | Lens 2 | −3.440800 (ASP) | 0.250 | Plastic | 1.640 | 23.3 | −4.24 |
| 5 | | 13.213100 (ASP) | 0.193 | | | | |
| 6 | Lens 3 | 3.589800 (ASP) | 0.334 | Plastic | 1.544 | 55.9 | 3.89 |
| 7 | | −4.982300 (ASP) | 0.467 | | | | |
| 8 | Lens 4 | −0.822370 (ASP) | 0.275 | Plastic | 1.640 | 23.3 | −72.99 |
| 9 | | −0.946330 (ASP) | 0.172 | | | | |
| 10 | Lens 5 | 2.230440 (ASP) | 0.782 | Plastic | 1.544 | 55.9 | −12.99 |
| 11 | | 1.485940 (ASP) | 0.700 | | | | |
| 12 | IR-Filter | Plano | 0.210 | Glass | 1.517 | 64.2 | — |
| 13 | | Plano | 0.419 | | | | |
| 14 | Image | Plano | — | | | | |

Note:
Reference wavelength (d-line) is 587.6 nm.

TABLE 6

Aspheric Coefficients

| | Surface # | | | | |
|---|---|---|---|---|---|
| | 2 | 3 | 4 | 5 | 6 |
| k = | 1.17813E−01 | −3.23370E+01 | −5.00000E+01 | −1.00000E+00 | −5.00000E+01 |
| A4 = | −7.78884E−03 | −9.58802E−02 | −4.04380E−01 | −3.41310E−01 | −2.01871E−01 |
| A6 = | −5.15337E−03 | 3.53900E−02 | 7.05899E−01 | 6.38888E−01 | 1.04822E−01 |
| A8 = | −1.16683E−01 | −2.18448E−01 | −1.27003E+00 | −8.88038E−01 | −1.53514E−01 |
| A10 = | 2.30406E−01 | −6.38196E−02 | 1.26025E+00 | 6.27119E−01 | 1.01972E−01 |
| A12 = | −2.28241E−01 | 2.93819E−01 | −4.62802E−01 | −5.94767E−02 | −1.92765E−01 |
| A14 = | −2.88318E−02 | −1.69545E−01 | 4.03185E−02 | −1.08096E−01 | 7.08013E−02 |

| | Surface # | | | | |
|---|---|---|---|---|---|
| | 7 | 8 | 9 | 10 | 11 |
| k = | −1.00000E+00 | −1.88659E+00 | −1.61075E+00 | −1.12949E+01 | −4.68888E+00 |
| A4 = | −2.00619E−01 | −1.81232E−01 | −1.04693E−01 | −1.26365E−01 | −1.02540E−01 |
| A6 = | 1.80182E−01 | 1.76064E−01 | 1.19025E−01 | 1.50564E−02 | 3.78592E−02 |
| A8 = | −2.55366E−01 | −5.54239E−02 | −3.57515E−02 | 3.99908E−03 | −1.22140E−02 |
| A10 = | 3.45066E−01 | 1.38352E−01 | 1.97050E−02 | −7.31321E−05 | 2.71373E−03 |
| A12 = | −2.76574E−01 | −9.47342E−02 | 3.73094E−03 | −1.56813E−04 | −3.56499E−04 |
| A14 = | 1.03634E−01 | 1.10510E−02 | −4.83792E−03 | 7.66529E−06 | 2.03009E−05 |

In the photographing system according to the 3rd embodiment, the definitions of f, Fno, HFOV, V3, V4, CT4, CT5, R1, R2, R5, R6, R7, f3, f4, f5, Td, TTL and ImgH are the same as those stated in the 1st embodiment with corresponding values for the 3rd embodiment. Moreover, these parameters can be calculated from Table 5 and Table 6 as the following values and satisfy the following relationships:

| f (mm) | 3.71 |
|---|---|
| Fno | 2.25 |
| HFOV (deg.) | 37.5 |
| V3 − V4 | 32.6 |
| CT5/CT4 | 2.84 |
| (R1 + R2)/(R1 − R2) | −1.26 |
| R5/R6 | −0.72 |
| R7/f | −0.22 |
| f/f3 + |f/f4| + |f/f5| | 1.29 |
| Td/CT5 | 4.20 |
| TTL/ImgH | 1.59 |

4th Embodiment

Figure 7:
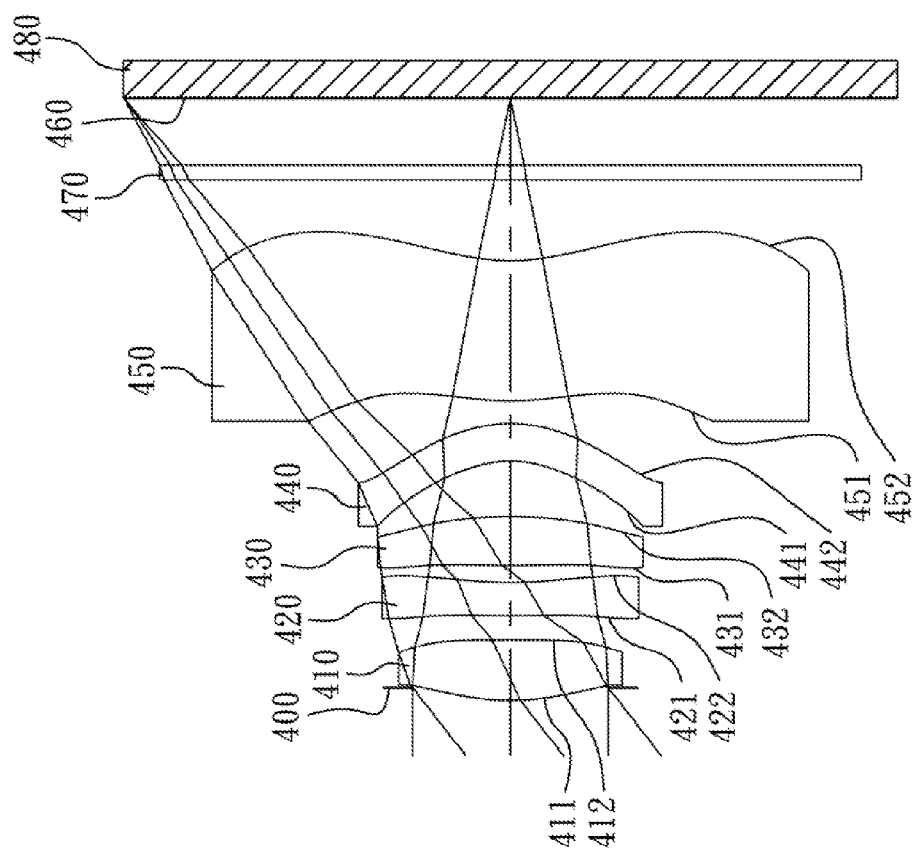
FIG. 7 is a schematic view of a photographing system according to the 4th embodiment of the present disclosure.
Figure 8:
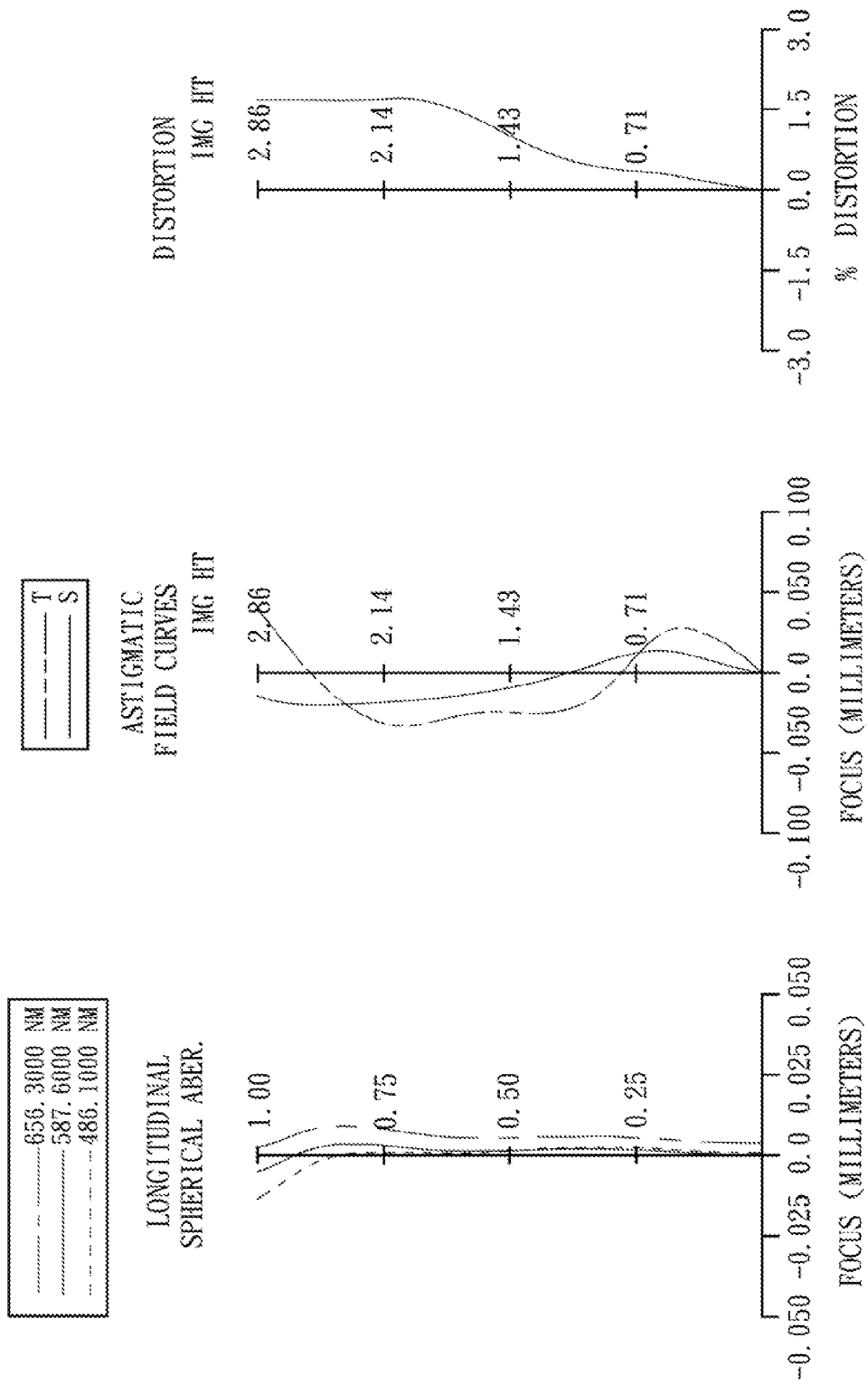
FIG. 8 shows spherical aberration curves, astigmatic field curves and a distortion curve of the photographing system according to the 4th embodiment.

FIG. 7 is a schematic view of a photographing system according to the 4th embodiment of the present disclosure. FIG. 8 shows spherical aberration curves, astigmatic field curves and a distortion curve of the photographing system according to the 4th embodiment. In FIG. 7, the photographing system includes, in order from an object side to an image side, an aperture stop 400, the first lens element 410, the second lens element 420, the third lens element 430, the fourth lens element 440, the fifth lens element 450, an IR-filter 470, an image plane 460 and an image sensor 480.

The first lens element 410 with positive refractive power has a convex object-side surface 411 and a convex image-side surface 412, and is made of plastic material. The object-side surface 411 and the mage-side surface 412 of the first lens element 410 are aspheric.

The second lens element 420 with negative refractive power has a convex object-side surface 421 and a concave image-side surface 422, and is made of plastic material. The object-side surface 421 and the image-side surface 422 of the second lens element 420 are aspheric.

The third lens element 430 with positive refractive power has a convex object-side surface 431 and a convex image-side surface 432, and is made of plastic material. The object-side surface 431 and the image-side surface 432 of the third lens element 430 are aspheric.

The fourth lens element 440 with negative refractive power has a concave object-side surface 441 and a convex image-side surface 442, and is made of plastic material. The object-side surface 441 and the image-side surface 442 of the fourth lens element 440 are aspheric.

The fifth lens element 450 with negative refractive power has a convex object-side surface 451 and a concave image-side surface 452, and is made of plastic material. The object-side surface 451 and the image-side surface 452 of the fifth lens element 450 are aspheric. Furthermore, the fifth lens element 450 has inflection points formed on the object-side surface 451 and the image-side surface 452 thereof.

The IR-filter 470 is made of glass and located between the fifth lens element 450 and the image plane 460, and will not affect the focal length of the photographing system.

The detailed optical data of the 4th embodiment are shown in Table 7 and the aspheric surface data are shown in Table 8 below.

TABLE 7

4th Embodiment
f = 3.55 mm, Fno = 2.45, HFOV = 38.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.092 | | | | |
| 2 | Lens 1 | 1.947970 (ASP) | 0.450 | Plastic | 1.544 | 55.9 | 3.39 |
| 3 | | −31.250000 (ASP) | 0.181 | | | | |
| 4 | Lens 2 | 8.953300 (ASP) | 0.240 | Plastic | 1.650 | 21.4 | −5.49 |
| 5 | | 2.524760 (ASP) | 0.128 | | | | |
| 6 | Lens 3 | 8.403400 (ASP) | 0.366 | Plastic | 1.544 | 55.9 | 4.31 |
| 7 | | −3.203800 (ASP) | 0.408 | | | | |
| 8 | Lens 4 | −0.787570 (ASP) | 0.280 | Plastic | 1.640 | 23.3 | −12.57 |
| 9 | | −0.994160 (ASP) | 0.170 | | | | |
| 10 | Lens 5 | 2.018600 (ASP) | 1.034 | Plastic | 1.544 | 55.9 | −28.94 |
| 11 | | 1.466290 (ASP) | 0.600 | | | | |
| 12 | IR-Filter | Plano | 0.110 | Glass | 1.517 | 64.2 | — |
| 13 | | Plano | 0.500 | | | | |
| 14 | Image | Plano | — | | | | |

Note:
Reference wavelength (d-line) is 587.6 nm.

TABLE 8

Aspheric Coefficients

| Surface # | | | | | |
|---|---|---|---|---|---|
| | 2 | 3 | 4 | 5 | 6 |
| k = | −1.53700E+00 | −9.00000E+01 | 2.00000E+01 | −2.87528E+01 | −9.00000E+01 |
| A4 = | −3.89411E−02 | −1.72620E−01 | −3.11479E−01 | −1.65780E−01 | −1.47101E−01 |
| A6 = | 1.56745E−02 | 6.26265E−02 | 4.58229E−01 | 2.41629E−01 | −7.83866E−02 |
| A8 = | −2.58259E−01 | −1.68041E−01 | −4.21850E−01 | −2.32866E−01 | 2.30262E−01 |
| A10 = | 2.19630E−01 | 6.09314E−02 | 1.96084E−01 | 8.31474E−02 | 2.85710E−02 |
| A12 = | −1.68723E−01 | 2.17502E−02 | 5.00937E−04 | −1.07609E−02 | −2.77643E−01 |
| A14 = | 1.00132E−02 | −1.34458E−02 | 1.12362E−02 | −4.24614E−03 | 3.42937E−01 |
| A16 = | | | | | −1.60393E−01 |

| Surface # | | | | | |
|---|---|---|---|---|---|
| | 7 | 8 | 9 | 10 | 11 |
| k = | −1.64913E+01 | −2.82540E+00 | −6.86047E−01 | −2.06212E+01 | −8.00311E+00 |
| A4 = | −3.65469E−02 | 1.03572E−01 | 1.95177E−01 | −1.46016E−01 | −5.82103E−02 |
| A6 = | −1.20018E−01 | −4.25124E−01 | −1.20829E−01 | 4.54654E−02 | 1.93389E−02 |
| A8 = | 1.18188E−01 | 4.54637E−01 | 4.30592E−02 | −1.56447E−02 | −6.54035E−03 |
| A10 = | 3.93477E−02 | −1.71210E−01 | 5.73241E−02 | 2.74964E−03 | 1.34373E−03 |
| A12 = | −3.36696E−02 | −3.00278E−02 | −1.70984E−02 | 8.66152E−04 | −1.53336E−04 |
| A14 = | 9.78754E−04 | −1.02499E−02 | −1.85179E−02 | −5.56226E−05 | 7.16877E−06 |
| A16 = | | 3.47989E−03 | 1.20208E−02 | −5.24432E−05 | |

In the photographing system according to the 4th embodiment, the definitions of f, Fno, HFOV, V3, V4, CT4, CT5, R1, R2, R5, R6, R7, f3, f4, f5, Td, TTL and ImgH are the same as those stated in the 1st embodiment with corresponding values for the 4th embodiment. Moreover, these parameters can be calculated from Table 7 and Table 8 as the following values and satisfy the following relationships:

| | |
|---|---|
| f (mm) | 3.55 |
| Fno | 2.45 |
| HFOV (deg.) | 38.4 |
| V3 − V4 | 32.6 |
| CT5/CT4 | 3.69 |
| (R1 + R2)/(R1 − R2) | −0.88 |
| R5/R6 | −2.62 |
| R7/f | −0.22 |
| f/f3 + |f/f4| + |f/f5| | 1.23 |
| Td/CT5 | 3.15 |
| TTL/ImgH | 1.55 |

5th Embodiment

Figure 9:
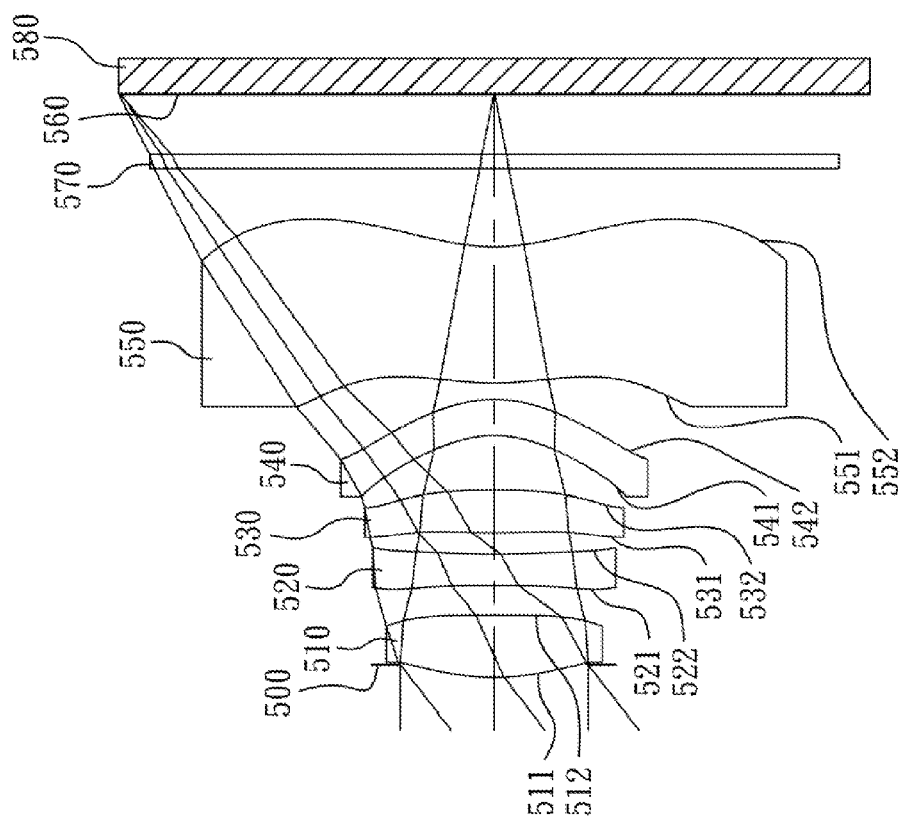
FIG. 9 is a schematic view of a photographing system according to the 5th embodiment of the present disclosure.
Figure 10:
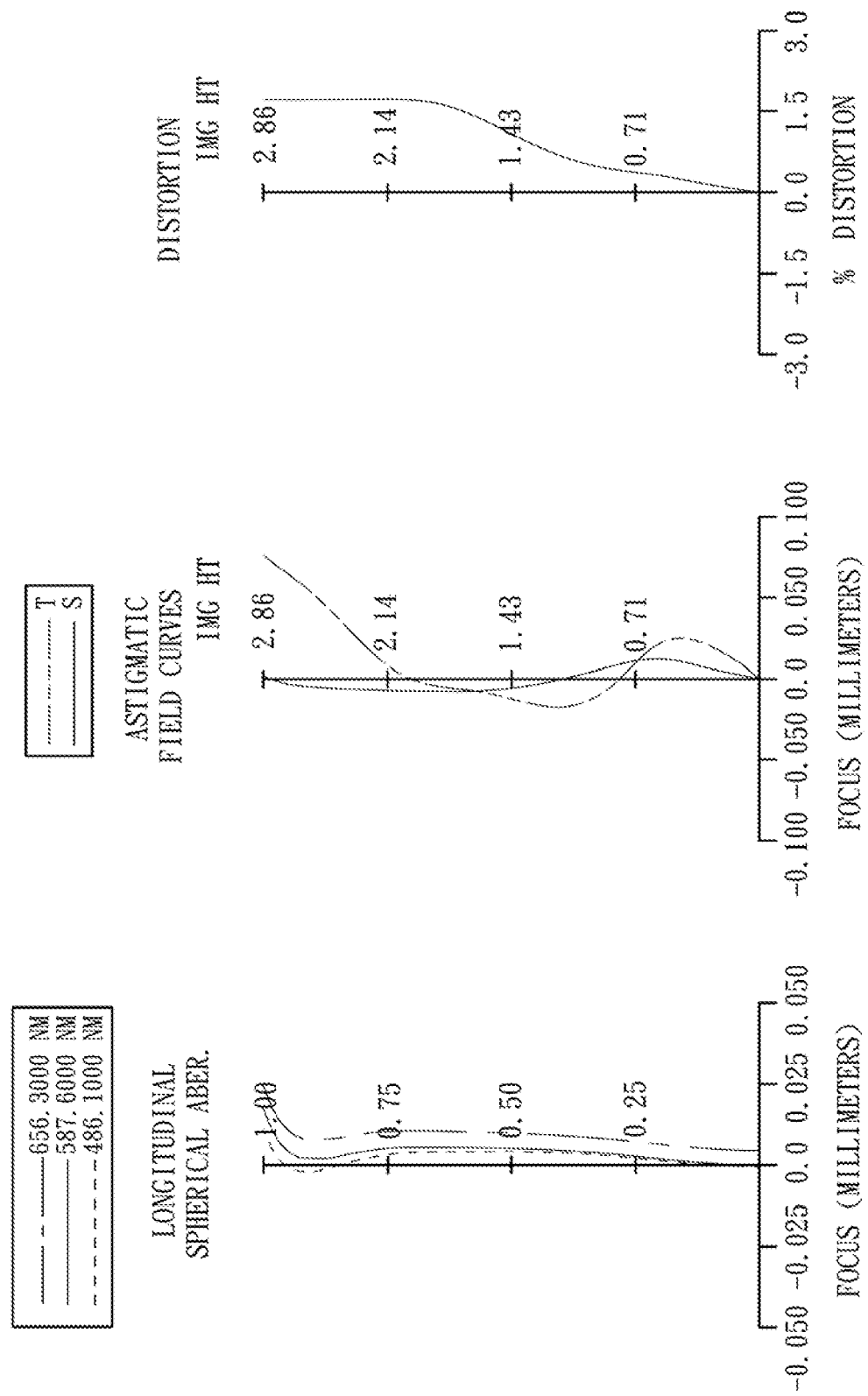
FIG. 10 shows spherical aberration curves, astigmatic field curves and a distortion curve of the photographing system according to the 5th embodiment.

FIG. 9 is a schematic view of a photographing system according to the 5th embodiment of the present disclosure. FIG. 10 shows spherical aberration curves, astigmatic field curves and a distortion curve of the photographing system according to the 5th embodiment. In FIG. 9, the photographing system includes, in order from an object side to an image side, an aperture stop 500, the first lens element 510, the second lens element 520, the third lens element 530, the fourth lens element 540, the fifth lens element 550, an IR-filter 570, an image plane 560 and an image sensor 580.

The first lens element 510 with positive refractive power has a convex object-side surface 511 and a convex image-side surface 512, and is made of glass. The object-side surface 511 and the image-side surface 512 of the first lens element 510 are aspheric.

The second lens element 520 with negative refractive power has a concave object-side surface 521 and a concave image-side surface 522, and is made of plastic material. The object-side surface 521 and the image-side surface 522 of the second lens element 520 are aspheric.

The third lens element 530 with positive refractive power has a convex object-side surface 531 and a convex image-side surface 532, and is made of plastic material. The object-side surface 531 and the image-side surface 532 of the third lens element 530 are aspheric.

The fourth lens element 540 with negative refractive power has a concave object-side surface 541 and a convex image-side surface 542, and is made of plastic material. The object-side surface 541 and the image-side surface 542 of the fourth lens element 540 are aspheric.

The fifth lens element 550 with negative refractive power has a convex object-side surface 551 and a concave image-side surface 552, and is made of plastic material. The object-side surface 551 and the image-side surface 552 of the fifth lens element 550 are aspheric. Furthermore, the fifth lens element 550 has inflection points formed on the object-side surface 551 and the image-side surface 552 thereof.

The IR-filter 570 is made of glass and located between the fifth lens element 550 and the image plane 560, and will not affect the focal length of the photographing system.

The detailed optical data of the 5th embodiment are shown in Table 9 and the aspheric surface data are shown in Table 10 below.

TABLE 9

5th Embodiment
f = 3.60 mm, Fno = 2.50 HFOV = 37.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.095 | | | | |
| 2 | Lens 1 | 1.921500 (ASP) | 0.479 | Glass | 1.566 | 61.1 | 3.33 |
| 3 | | −87.719300 (ASP) | 0.224 | | | | |
| 4 | Lens 2 | −94.339600 (ASP) | 0.240 | Plastic | 1.650 | 21.4 | −6.26 |
| 5 | | 4.254100 (ASP) | 0.168 | | | | |
| 6 | Lens 3 | 6.492600 (ASP) | 0.326 | Plastic | 1.544 | 55.9 | 5.18 |
| 7 | | −4.901300 (ASP) | 0.417 | | | | |
| 8 | Lens 4 | −0.841690 (ASP) | 0.280 | Plastic | 1.640 | 23.3 | −18.76 |
| 9 | | −1.022660 (ASP) | 0.122 | | | | |
| 10 | Lens 5 | 2.227170 (ASP) | 1.044 | Plastic | 1.544 | 55.9 | −15.94 |
| 11 | | 1.479320 (ASP) | 0.600 | | | | |
| 12 | IR-Filter | Plano | 0.110 | Glass | 1.517 | 64.2 | — |
| 13 | | Plano | 0.461 | | | | |
| 14 | Image | Plano | — | | | | |

Note:
Reference wavelength (d-line) is 587.6 nm.

TABLE 10

Aspheric Coefficients

| | Surface # | | | | |
|---|---|---|---|---|---|
| | 2 | 3 | 4 | 5 | 6 |
| k = | −1.49453E+00 | −9.00000E+01 | −9.00000E+01 | −9.00000E+01 | −9.00000E+01 |
| A4 = | −3.64775E−02 | −1.66807E−01 | −2.61255E−01 | −1.78683E−01 | −1.77119E−01 |
| A6 = | −4.26996E−03 | 3.06798E−02 | 4.46777E−01 | 3.03241E−01 | −8.88095E−02 |
| A8 = | −1.98389E−01 | −1.07392E−01 | −3.70153E−01 | −1.83601E−01 | 2.06959E−01 |

TABLE 10-continued

| Aspheric Coefficients | | | | |
|---|---|---|---|---|
| A10 = 1.99116E−01 | 6.70951E−02 | 2.61124E−01 | 5.53974E−02 | 4.67993E−02 |
| A12 = −1.68728E−01 | 2.17490E−02 | 4.32571E−03 | 4.87838E−04 | −2.27550E−01 |
| A14 = 1.00149E−02 | −1.34464E−02 | −5.59788E−02 | 5.49606E−03 | 3.04753E−01 |
| A16 = | | | | −1.60392E−01 |

| | Surface # | | | |
|---|---|---|---|---|
| 7 | 8 | 9 | 10 | 11 |
| k = 4.30356E−01 | −2.88181E+00 | −7.05426E−01 | −2.46169E+01 | −8.11184E+00 |
| A4 = −4.88543E−02 | 1.17057E−01 | 2.04396E−01 | −1.46016E−01 | −5.82103E−02 |
| A6 = −1.46444E−01 | −4.16211E−01 | −1.22353E−01 | 4.54654E−02 | 1.93389E−02 |
| A8 = 1.29787E−01 | 4.52866E−01 | 4.24800E−02 | −1.56447E−02 | −6.54035E−03 |
| A10 = 5.69830E−02 | −1.78554E−01 | 5.56085E−02 | 2.74964E−03 | 1.34373E−03 |
| A12 = −2.01859E−02 | −1.84328E−02 | −2.20380E−02 | 8.66152E−04 | −1.53336E−04 |
| A14 = −1.98795E−03 | 4.96184E−03 | −2.47299E−02 | −5.56226E−05 | 7.16877E−06 |
| A16 = | −4.12597E−03 | 1.38065E−02 | −5.24432E−05 | |

In the photographing system according to the 5th embodiment, the definitions of f, Fno, HFOV, V3, V4, CT4, CT5, R1, R2, R5, R6, R7, f3, f4, f5, Td, TTL and ImgH are the same as those stated in the 1st embodiment with corresponding values for the 5th embodiment. Moreover, these parameters can be calculated from Table 9 and Table 10 as the following values and satisfy the following relationships:

| | |
|---|---|
| f (mm) | 3.60 |
| Fno | 2.50 |
| HFOV (deg.) | 37.9 |
| V3 − V4 | 32.6 |
| CT5/CT4 | 3.73 |
| (R1 + R2)/(R1 − R2) | −0.96 |
| R5/R6 | −1.32 |
| R7/f | −0.23 |
| f/f3 + |f/f4| + |f/f5| | 1.11 |
| Td/CT5 | 3.16 |
| TTL/ImgH | 1.55 |

6th Embodiment

Figure 11:
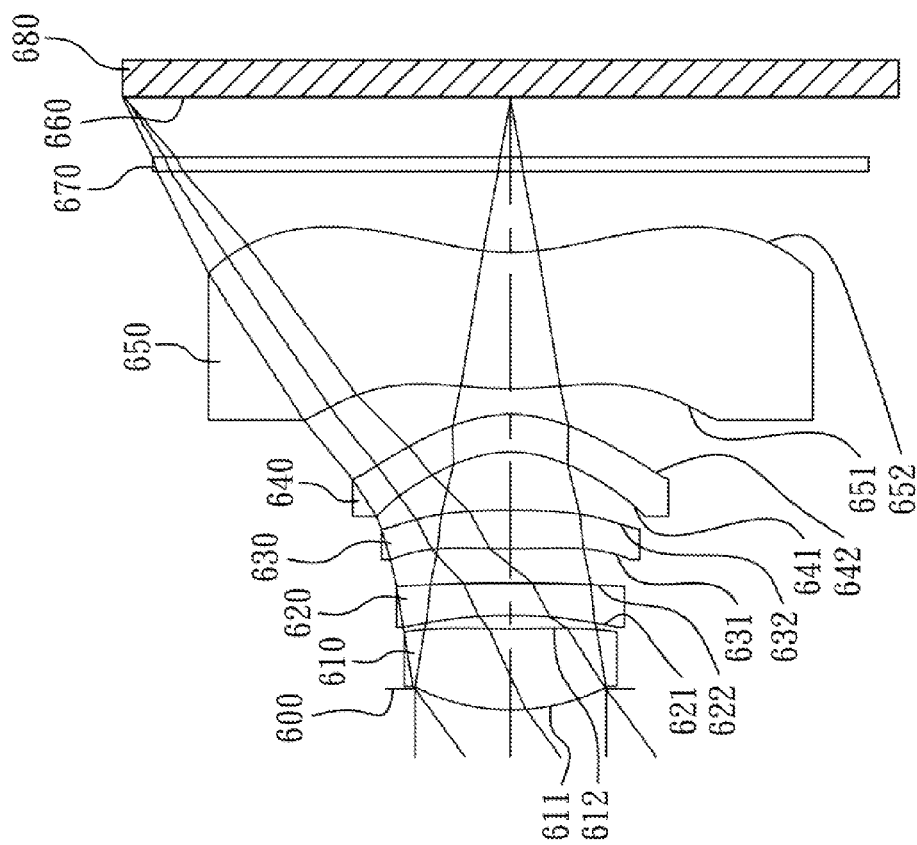
FIG. 11 is a schematic view of a photographing system according to the 6th embodiment of the present disclosure.
Figure 12:
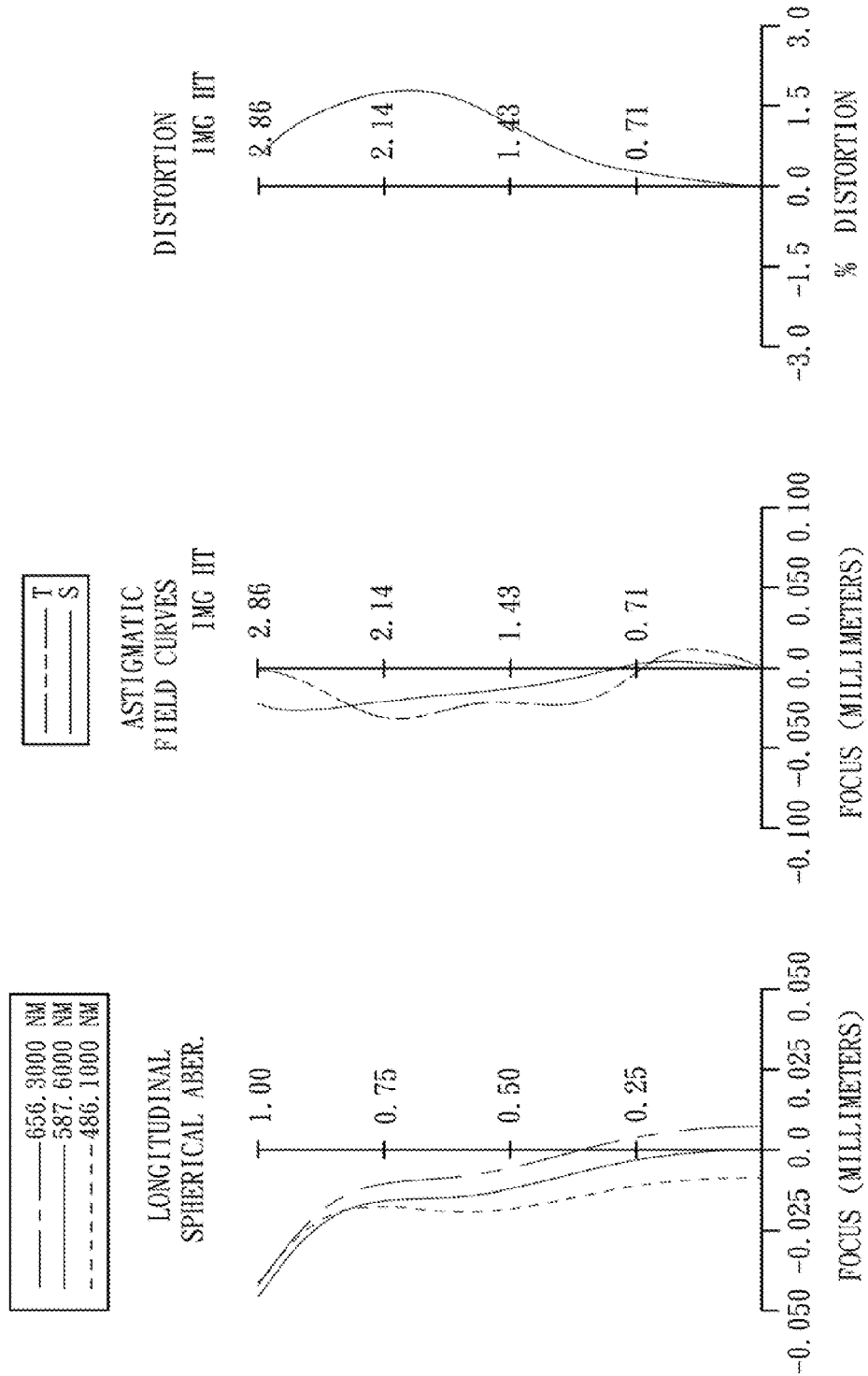
FIG. 12 shows spherical aberration curves, astigmatic field curves and a distortion curve of the photographing system according to the 6th embodiment.

FIG. 11 is a schematic view of a photographing system according to the 6th embodiment of the present disclosure. FIG. 12 shows spherical aberration curves, astigmatic field curves and a distortion curve of the photographing system according to the 6th embodiment. In FIG. 11, the photographing system includes, in order from an object side to an image side, an aperture stop 600, the first lens element 610, the second lens element 620 the third lens element 630, the fourth lens element 640, the fifth lens element 650, an IR-filter 670, an image plane 660 and an image sensor 680.

The first lens element 610 with positive refractive power has a convex object-side surface 611 and a concave image-side surface 612, and is made of plastic material. The object-side surface 611 and the image-side surface 612 of the first lens element 610 are aspheric.

The second lens element 620 with negative refractive power has a concave object-side surface 621 and a convex image-side surface 622, and is made of plastic material. The object-side surface 621 and the image-side surface 622 of the second lens element 620 are aspheric.

The third lens element 630 with positive refractive power has a convex object-side surface 631 and a convex image-side surface 632, and is made of plastic material. The object-side surface 631 and the image-side surface 632 of the third lens element 630 are aspheric.

The fourth lens element 640 with negative refractive power has a concave object-side surface 641 and a convex image-side surface 642, and is made of plastic material. The object-side surface 641 and the image-side surface 642 of the fourth lens element 640 are aspheric.

The fifth lens element 650 with negative refractive power has a convex object-side surface 651 and a concave image-side surface 652, and is made of plastic material. The object-side surface 651 and the image-side surface 652 of the fifth lens element 650 are aspheric. Furthermore, the fifth lens element 650 has inflection points formed on the object-side surface 651 and the image-side surface 652 thereof.

The IR-filter 670 is made of glass and located between the fifth lens element 650 and the image plane 660, and will not affect the focal length of the photographing system.

The detailed optical data of the 6th embodiment are shown in Table 11 and the aspheric surface data are shown in Table 12 below.

TABLE 11

6th Embodiment
f = 3.85 mm, Fno = 2.72, HFOV = 36.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.155 | | | | |
| 2 | Lens 1 | 1.536910 (ASP) | 0.602 | Plastic | 1.544 | 55.9 | 3.17 |
| 3 | | 12.012400 (ASP) | 0.098 | | | | |
| 4 | Lens 2 | −4.849000 (ASP) | 0.240 | Plastic | 1.650 | 21.4 | −7.88 |
| 5 | | −93.457900 (ASP) | 0.258 | | | | |
| 6 | Lens 3 | 8.094200 (ASP) | 0.283 | Plastic | 1.544 | 55.9 | 6.23 |
| 7 | | −5.756100 (ASP) | 0.433 | | | | |

TABLE 11-continued

6th Embodiment
f = 3.85 mm, Fno = 2.72, HFOV = 36.5 deg.

| Surface # | | Curvature Radius | Thickness | Material | Index | Abbe # | Focal length |
|---|---|---|---|---|---|---|---|
| 8 | Lens 4 | −0.840090 (ASP) | 0.280 | Plastic | 1.640 | 23.3 | −15.35 |
| 9 | | −1.038170 (ASP) | 0.187 | | | | |
| 10 | Lens 5 | 2.771170 (ASP) | 1.011 | Plastic | 1.544 | 55.9 | −10.18 |
| 11 | | 1.609620 (ASP) | 0.600 | | | | |
| 12 | IR-Filter | Plano | 0.110 | Glass | 1.517 | 64.2 | — |
| 13 | | Plano | 0.441 | | | | |
| 14 | Image | Plano | — | | | | |

Note:
Reference wavelength (d-line) is 587.6 nm.

TABLE 12

Aspheric Coefficients

| | Surface # | | | | |
|---|---|---|---|---|---|
| | 2 | 3 | 4 | 5 | 6 |
| k = | −1.92293E−01 | 2.00000E+01 | −7.34947E+01 | 2.00000E+01 | −4.19497E+01 |
| A4 = | −6.35001E−03 | −1.47648E−01 | −2.70171E−01 | −1.66946E−01 | −1.85000E−01 |
| A6 = | 2.18335E−02 | 2.61083E−02 | 3.91350E−01 | 3.37259E−01 | −1.29400E−01 |
| A8 = | −1.22634E−01 | −5.77285E−02 | −3.14101E−01 | −2.33866E−01 | 1.88037E−01 |
| A10 = | 1.96544E−01 | 7.63358E−02 | 2.30682E−01 | 1.67676E−02 | 4.52168E−03 |
| A12 = | −1.68771E−01 | 4.02608E−02 | −1.28767E−03 | −1.74359E−03 | −2.28478E−01 |
| A14 = | 5.32871E−03 | −8.43956E−03 | −6.15793E−02 | 4.72999E−03 | 3.05477E−01 |
| A16 = | | | | | −1.54900E−01 |

| | Surface # | | | | |
|---|---|---|---|---|---|
| | 7 | 8 | 9 | 10 | 11 |
| k = | 1.05642E+01 | −2.50052E+00 | −6.70785E−01 | −3.53868E+01 | −9.21211E+00 |
| A4 = | −6.20851E−02 | 1.03726E−01 | 1.97080E−01 | −1.46016E−01 | −5.82103E−02 |
| A6 = | −1.61939E−01 | −4.19040E−01 | −1.24276E−01 | 4.54654E−02 | 1.93389E−02 |
| A8 = | 1.21910E−01 | 4.53469E−01 | 4.41607E−02 | −1.56447E−02 | −6.54035E−03 |
| A10 = | 8.61444E−02 | −1.71137E−01 | 5.56099E−02 | 2.74964E−03 | 1.34373E−03 |
| A12 = | −2.08141E−02 | −2.17403E−02 | −2.47016E−02 | 8.66152E−04 | −1.53336E−04 |
| A14 = | −5.44840E−03 | 6.84839E−04 | −2.72078E−02 | −5.56226E−05 | 7.16877E−06 |
| A16 = | | −3.35030E−03 | 1.58864E−02 | −5.24432E−05 | |

In the photographing system according to the 6th embodiment, the definitions of f, Fno, HFOV, V3, V4, CT4, CT5, R1, R2, R5, R6, R7, f3, f4, f5, Td, TTL and ImgH are the same as those stated in the 1st embodiment with corresponding values for the 6th embodiment. Moreover, these parameters can be calculated from Table 11 and Table 12 as the following values and satisfy the following relationships:

| | |
|---|---|
| f (mm) | 3.85 |
| Fno | 2.72 |
| HFOV (deg.) | 36.5 |
| V3 − V4 | 32.6 |
| CT5/CT4 | 3.61 |
| (R1 + R2)/(R1 − R2) | −1.29 |
| R5/R6 | −1.41 |
| R7/f | −0.22 |
| f/f3 + |f/f4| + |f/f5| | 1.25 |
| Td/CT5 | 3.36 |
| TTL/ImgH | 1.58 |

7th Embodiment

Figure 13:
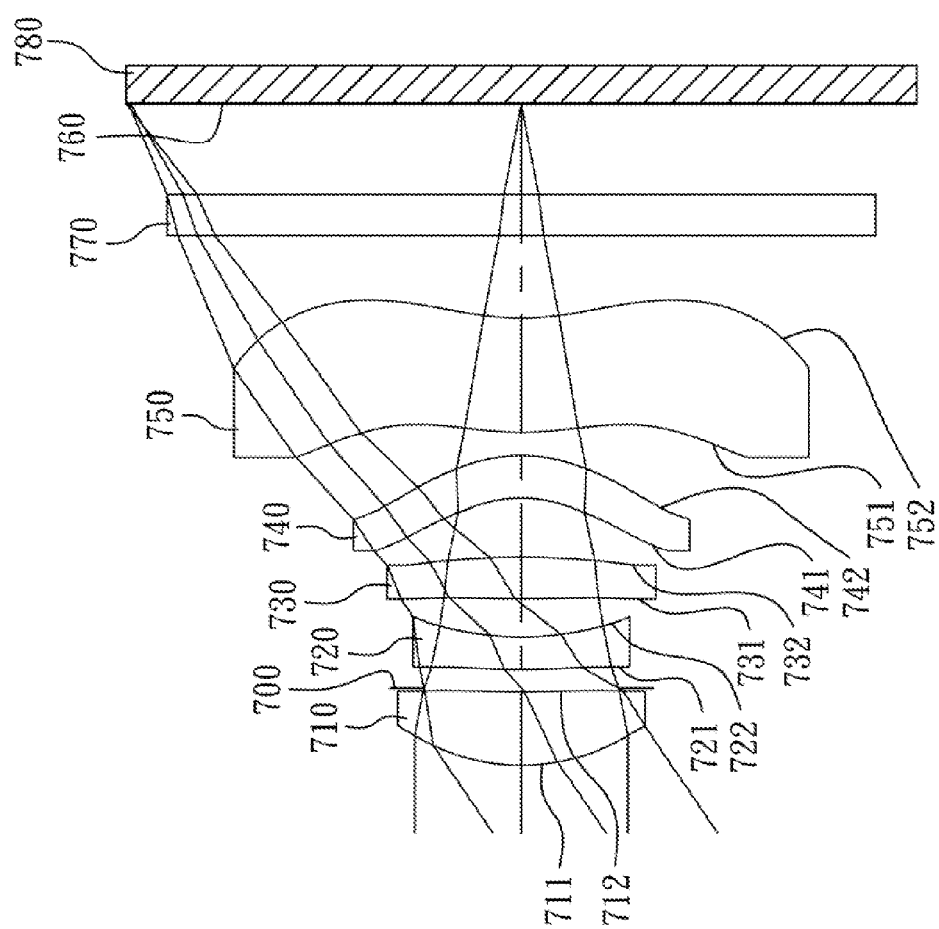
FIG. 13 is a schematic view of a photographing system according to the 7th embodiment of the present disclosure.
Figure 14:
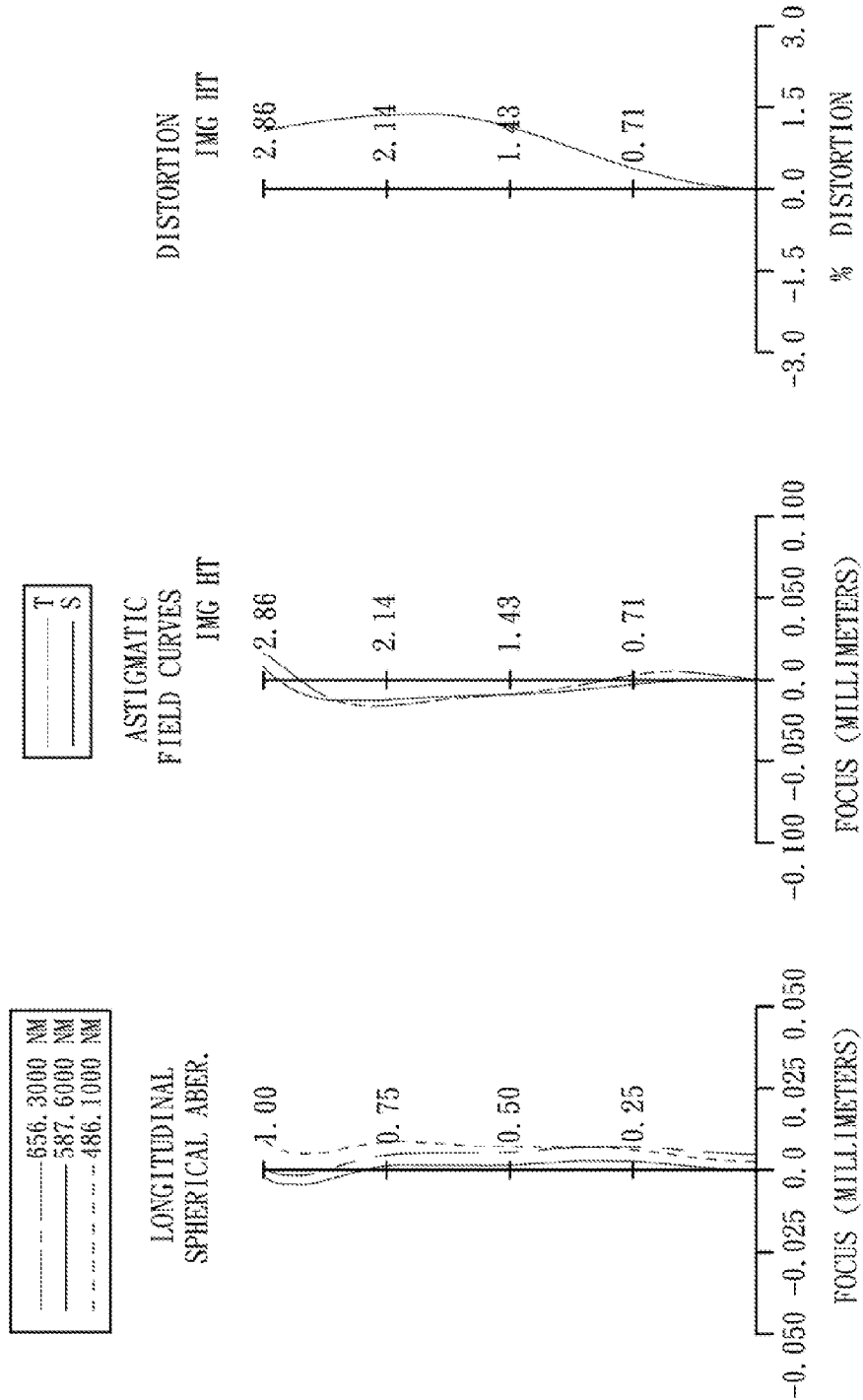
FIG. 14 shows spherical aberration curves, astigmatic field curves and a distortion curve of the photographing system according to the 7th embodiment.

FIG. 13 is a schematic view of a photographing system according to the 7th embodiment of the present disclosure. FIG. 14 shows spherical aberration curves, astigmatic field curves and a distortion curve of the photographing system according to the 7th embodiment. In FIG. 13, the photographing system includes, in order from an object side to an image side, the first lens element 710, an aperture stop 700, the second lens element 720, the third lens element 730, the fourth lens element 740, the fifth lens element 750, an IR-filter 770, an image plane 760 and an image sensor 780.

The first lens element 710 with positive refractive power has a convex object-side surface 711 and a concave image-side surface 712, and is made of plastic material. The object-side surface 711 and the image-side surface 712 of the first lens element 710 are aspheric.

The second lens element 720 with negative refractive power has a convex object-side surface 721 and a concave image-side surface 722, and is made of plastic material. The object-side surface 721 and the image-side surface 722 of the second lens element 720 are aspheric.

The third lens element 730 with positive refractive power has a convex object-side surface 731 and a convex image-side surface 732, and is made of plastic material. The object-side surface 731 and the image-side surface 732 of the third lens element 730 are aspheric.

The fourth lens element 740 with negative refractive power has a concave object-side surface 741 and a convex image-side surface 742, and is made of plastic material. The object-side surface 741 and the image-side surface 742 of the fourth lens element 740 are aspheric.

The fifth lens element 750 with negative refractive power has a convex object-side surface 751 and a concave image-side surface 752, and is made of plastic material. The object-side surface 751 and the image-side surface 752 of the fifth lens element 750 are aspheric. Furthermore, the fifth lens element 750 has inflection points formed on the object-side surface 751 and the image-side surface 752 thereof.

The IR-filter 770 is made of glass and located between the fifth lens element 750 and the image plane 760, and will not affect the focal length of the photographing system.

The detailed optical data of the 7th embodiment are shown in Table 13 and the aspheric surface data are shown in Table 14 below.

In the photographing system according to the 7th embodiment, the definitions of f, Fno, HFOV, V3, V4, CT4, CT5, R1, R2, R5, R6, R7, f3, f4, f5, Td, TTL and ImgH are the same as those stated in the 1st embodiment with corresponding values for the 7th embodiment. Moreover, these parameters can be calculated from Table 13 and Table 14 as the following values and satisfy the following relationships:

| | |
|---|---|
| f (mm) | 4.17 |
| Fno | 2.68 |
| HFOV (deg.) | 34.1 |
| V3 − V4 | 34.5 |
| CT5/CT4 | 2.69 |
| (R1 + R2)/(R1 − R2) | −1.30 |

TABLE 13

7th Embodiment
f = 4.17 mm, Fno = 2.68, HFOV = 34.1 deg.

| Surface # | | Curvature Radius | Thickness | Material | Index | Abbe # | Focal length |
|---|---|---|---|---|---|---|---|
| 0 | Object | Plano | infinity | | | | |
| 1 | Lens 1 | 1.490520 (ASP) | 0.535 | Plastic | 1.544 | 55.9 | 3.09 |
| 2 | | 11.344700 (ASP) | 0.024 | | | | |
| 3 | Ape. Stop | Plano | 0.138 | | | | |
| 4 | Lens 2 | 5.038300 (ASP) | 0.240 | Plastic | 1.650 | 21.4 | −4.93 |
| 5 | | 1.920660 (ASP) | 0.278 | | | | |
| 6 | Lens 3 | 10.718500 (ASP) | 0.302 | Plastic | 1.544 | 55.9 | 6.76 |
| 7 | | −5.543300 (ASP) | 0.433 | | | | |
| 8 | Lens 4 | −0.887360 (ASP) | 0.310 | Plastic | 1.650 | 21.4 | −16.60 |
| 9 | | −1.099960 (ASP) | 0.174 | | | | |
| 10 | Lens 5 | 2.137480 (ASP) | 0.834 | Plastic | 1.544 | 55.9 | −94.10 |
| 11 | | 1.769710 (ASP) | 0.600 | | | | |
| 12 | IR-Filter | Plano | 0.300 | Glass | 1.517 | 64.2 | — |
| 13 | | Plano | 0.669 | | | | |
| 14 | Image | Plano | — | | | | |

Note:
Reference wavelength (d-line) is 587.6 nm.

TABLE 14

Aspheric Coefficients

| | Surface # | | | | |
|---|---|---|---|---|---|
| | 1 | 2 | 4 | 5 | 6 |
| k = | −8.91881E−02 | 1.43813E+01 | −3.08855E+01 | −9.11883E+00 | 6.31914E+00 |
| A4 = | −1.45923E−04 | −8.95172E−02 | −2.38189E−01 | −8.77122E−02 | −7.28043E−02 |
| A6 = | 1.46177E−02 | 1.11069E−01 | 4.70202E−01 | 3.63480E−01 | −1.17820E−01 |
| A8 = | −9.90863E−02 | −1.27617E−01 | −4.86426E−01 | −3.50528E−01 | 2.32441E−01 |
| A10 = | 1.88259E−01 | −8.31143E−03 | 1.84201E−01 | 1.83149E−01 | −1.37611E−02 |
| A12 = | −1.76757E−01 | 4.63379E−03 | −6.53358E−03 | −3.03684E−03 | −2.76493E−01 |
| A14 = | 1.58427E−02 | −9.53415E−03 | 1.59569E−02 | −1.27106E−02 | 3.45610E−01 |
| A16 = | | | | | −1.55630E−01 |

| | Surface # | | | | |
|---|---|---|---|---|---|
| | 7 | 8 | 9 | 10 | 11 |
| k = | −1.00000E+02 | −3.12546E+00 | −6.03471E−01 | −1.52369E+01 | −9.16412E+00 |
| A4 = | −1.16543E−02 | 1.33213E−01 | 1.78302E−01 | −1.62722E−01 | −8.59039E−02 |
| A6 = | −1.21713E−01 | −4.13368E−01 | −1.29290E−01 | 5.33346E−02 | 2.64668E−02 |
| A8 = | 1.74005E−01 | 4.56605E−01 | 4.24363E−01 | −1.18980E−02 | −8.12118E−03 |
| A10 = | −3.38514E−02 | −1.52961E−01 | 6.03616E−02 | 1.61760E−03 | 1.56054E−03 |
| A12 = | 6.08740E−04 | 1.04554E−02 | −7.83495E−03 | 5.32736E−04 | −1.76515E−04 |
| A14 = | −1.21573E−04 | −8.71482E−03 | −2.04677E−02 | −1.68605E−04 | 7.63434E−06 |
| A16 = | | 1.13378E−03 | 5.30016E−03 | 3.27236E−06 | |

-continued

| | |
|---|---|
| R5/R6 | −1.93 |
| R7/f | −0.21 |
| f/f3 + \|f/f4\| + \|f/f5\| | 0.91 |
| Td/CT5 | 3.92 |
| TTL/ImgH | 1.66 |

8th Embodiment

Figure 15:
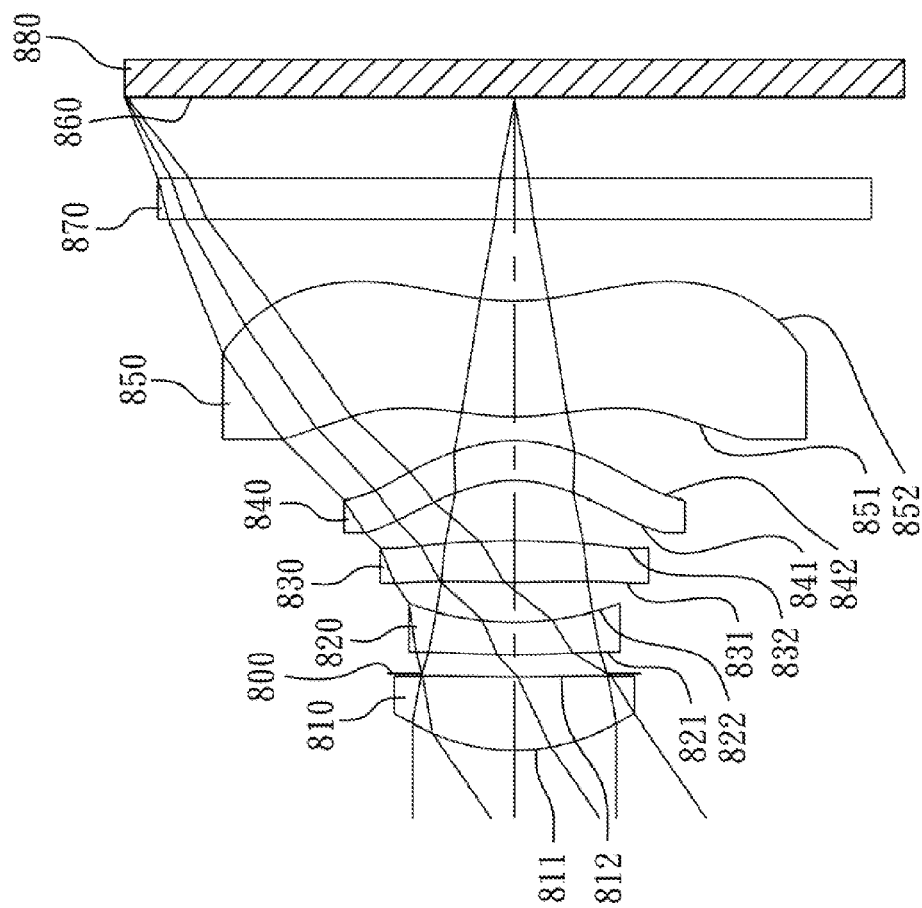
FIG. 15 is a schematic view of a photographing system according to the 8th embodiment of the present disclosure.
Figure 16:
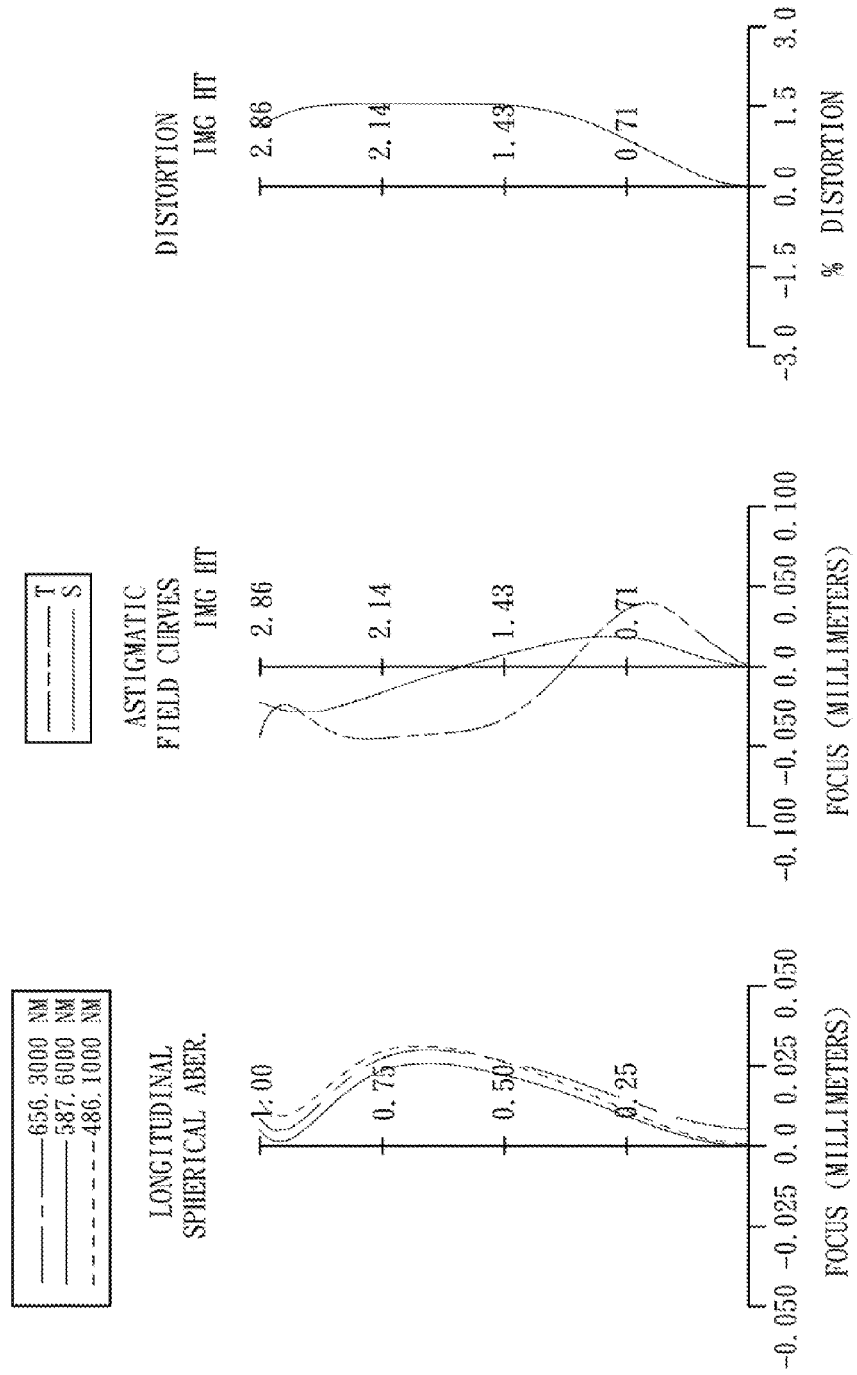
FIG. 16 shows spherical aberration curves, astigmatic field curves and a distortion curve of the photographing system according to the 8th embodiment.

FIG. 15 is a schematic view of a photographing system according to the 8th embodiment of the present disclosure FIG. 16 shows spherical aberration curves, astigmatic field curves and a distortion curve of the photographing system according to the 8th embodiment. In FIG. 15, the photographing system includes, in order from an object side to an image side, the first lens element 810, an aperture stop 800, the second lens element 820, the third lens element 830, the fourth lens element 840, the fifth lens element 850, an IR-filter 870, an image plane 860 and an image sensor 880.

The first lens element 810 with positive refractive power has a convex object-side surface 811 and a concave image-side surface 812, and is made of plastic material. The object-side surface 811 and the image-side surface 812 of the first lens element 810 are aspheric.

The second lens element 820 with negative refractive power has a convex object-side surface 821 and a concave image-side surface 822, and is made of plastic material. The object-side surface 821 and the image-side surface 822 of the second lens element 820 are aspheric.

The third lens element 830 with positive refractive power has a convex object-side surface 831 and a convex image-side surface 832, and is made of plastic material. The object-side surface 831 and the image-side surface 832 of the third lens element 830 are aspheric.

The fourth lens element 840 with negative refractive power has a concave object-side surface 841 and a convex image-side surface 842, and is made of plastic material. The object-side surface 841 and the image-side surface 842 of the fourth lens element 840 are aspheric.

The fifth lens element 850 with positive refractive power has a convex object-side surface 851 and a concave image-side surface 852, and is made of plastic material. The object-side surface 851 and the image-side surface 852 of the fifth lens element 850 are aspheric. Furthermore, the fifth lens element 850 has inflection points formed on the object-side surface 851 and the image-side surface 852 thereof.

The IR-filter 870 is made of glass and located between the fifth lens element 850 and the image plane 860, and will not affect the focal length of the photographing system.

The detailed optical data of the 8th embodiment are shown in Table 15 and the aspheric surface data are shown in Table 16 below.

TABLE 15

8th Embodiment
f = 4.11 mm, Fno = 2.75, HFOV = 34.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.494080 (ASP) | 0.535 | Plastic | 1.544 | 55.9 | 3.13 |
| 2 | | 10.529900 (ASP) | 0.026 | | | | |
| 3 | Ape. Stop | Plano | 0.140 | | | | |
| 4 | Lens 2 | 4.810200 (ASP) | 0.240 | Plastic | 1.650 | 21.4 | −5.37 |
| 5 | | 1.982730 (ASP) | 0.290 | | | | |
| 6 | Lens 3 | 11.423300 (ASP) | 0.307 | Plastic | 1.544 | 55.9 | 7.30 |
| 7 | | −6.035400 (ASP) | 0.442 | | | | |
| 8 | Lens 4 | −0.889880 (ASP) | 0.291 | Plastic | 1.583 | 30.2 | −12.10 |
| 9 | | −1.132660 (ASP) | 0.181 | | | | |
| 10 | Lens 5 | 1.928630 (ASP) | 0.849 | Plastic | 1.544 | 55.9 | 108.30 |
| 11 | | 1.684580 (ASP) | 0.600 | | | | |
| 12 | IR-Filter | Plano | 0.300 | Glass | 1.517 | 64.2 | — |
| 13 | | Plano | 0.596 | | | | |
| 14 | Image | Plano | — | | | | |

Note:
Reference wavelength (d-line) is 587.6 nm.

TABLE 16

Aspheric Coefficients

| | Surface # | | | | |
|---|---|---|---|---|---|
| | 1 | 2 | 4 | 5 | 6 |
| k = | −1.01015E−01 | 1.43813E+01 | −2.77435E+01 | −9.08400E+00 | 5.93558E+00 |
| A4 = | −6.52056E−04 | −9.03877E−02 | −2.35857E−01 | −8.76882E−02 | −7.15139E−02 |
| A6 = | 1.35389E−02 | 1.06685E−01 | 4.75042E−01 | 3.63459E−01 | −1.20118E−01 |
| A8 = | −1.01202E−01 | −1.34864E−01 | −4.83779E−01 | −3.50063E−01 | 2.32713E−01 |
| A10 = | 1.84963E−01 | −1.13936E−02 | 1.96935E−01 | 1.85719E−01 | −1.33753E−02 |
| A12 = | −1.76702E−01 | −5.61511E−03 | −1.90175E−02 | −1.34227E−02 | −2.75198E−01 |
| A14 = | 1.08951E−02 | 1.46806E−02 | −6.97367E−02 | −1.83969E−02 | 3.48603E−01 |
| A16 = | | | | | −1.58389E−01 |

TABLE 16-continued

Aspheric Coefficients

| | Surface # | | | |
|---|---|---|---|---|
| 7 | 8 | 9 | 10 | 11 |
| k = −1.00000E+02 | −3.27238E+00 | −6.05027E−01 | −1.54772E+01 | −8.08681E+00 |
| A4 = −1.32340E−02 | 1.35138E−01 | 1.77943E−01 | −1.60150E−01 | −9.02679E−02 |
| A6 = −1.21585E−01 | −4.13666E−01 | −1.29014E−01 | 5.35695E−02 | 2.81801E−02 |
| A8 = 1.74437E−01 | 4.56884E−01 | 4.23406E−02 | −1.18696E−02 | −8.28031E−03 |
| A10 = −3.34941E−02 | −1.52826E−01 | 6.03040E−02 | 1.62044E−03 | 1.54922E−03 |
| A12 = 6.64182E−04 | 1.05769E−02 | −7.80478E−03 | 5.32970E−04 | −1.75659E−04 |
| A14 = −3.88362E−04 | −8.56319E−03 | −2.04681E−02 | −1.68568E−04 | 8.11999E−06 |
| A16 = | 1.11627E−03 | 5.28566E−03 | 3.30814E−06 | |

In the photographing system according to the 8th embodiment, the definitions of f, Fno, HFOV, V3, V4, CT4, CT5, R1, R2, R5, R6, R7, f3, f4, f5, Td, TTL and ImgH are the same as those stated in the 1st embodiment with corresponding values for the 8th embodiment. Moreover, these parameters can be calculated from Table 15 and Table 16 as the following values and satisfy the following relationships:

| | |
|---|---|
| f (mm) | 4.11 |
| Fno | 2.75 |
| HFOV (deg.) | 34.4 |
| V3 − V4 | 34.5 |
| CT5/CT4 | 2.92 |
| (R1 + R2)/(R1 − R2) | −1.33 |
| R5/R6 | −1.89 |
| R7/f | −0.22 |
| f/f3 + |f/f4| + |f/f5| | 0.94 |
| Td/CT5 | 3.89 |
| TTL/ImgH | 1.64 |

9th Embodiment

Figure 17:
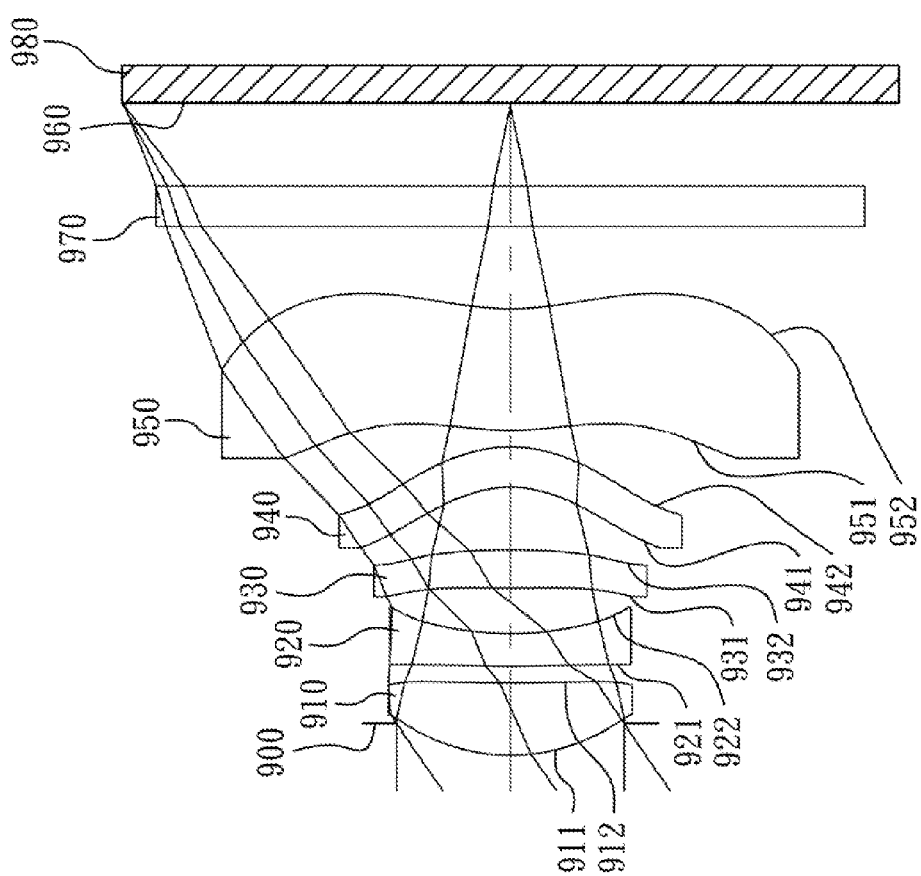
FIG. 17 is a schematic view of a photographing system according to the 9th embodiment of the present disclosure.
Figure 18:
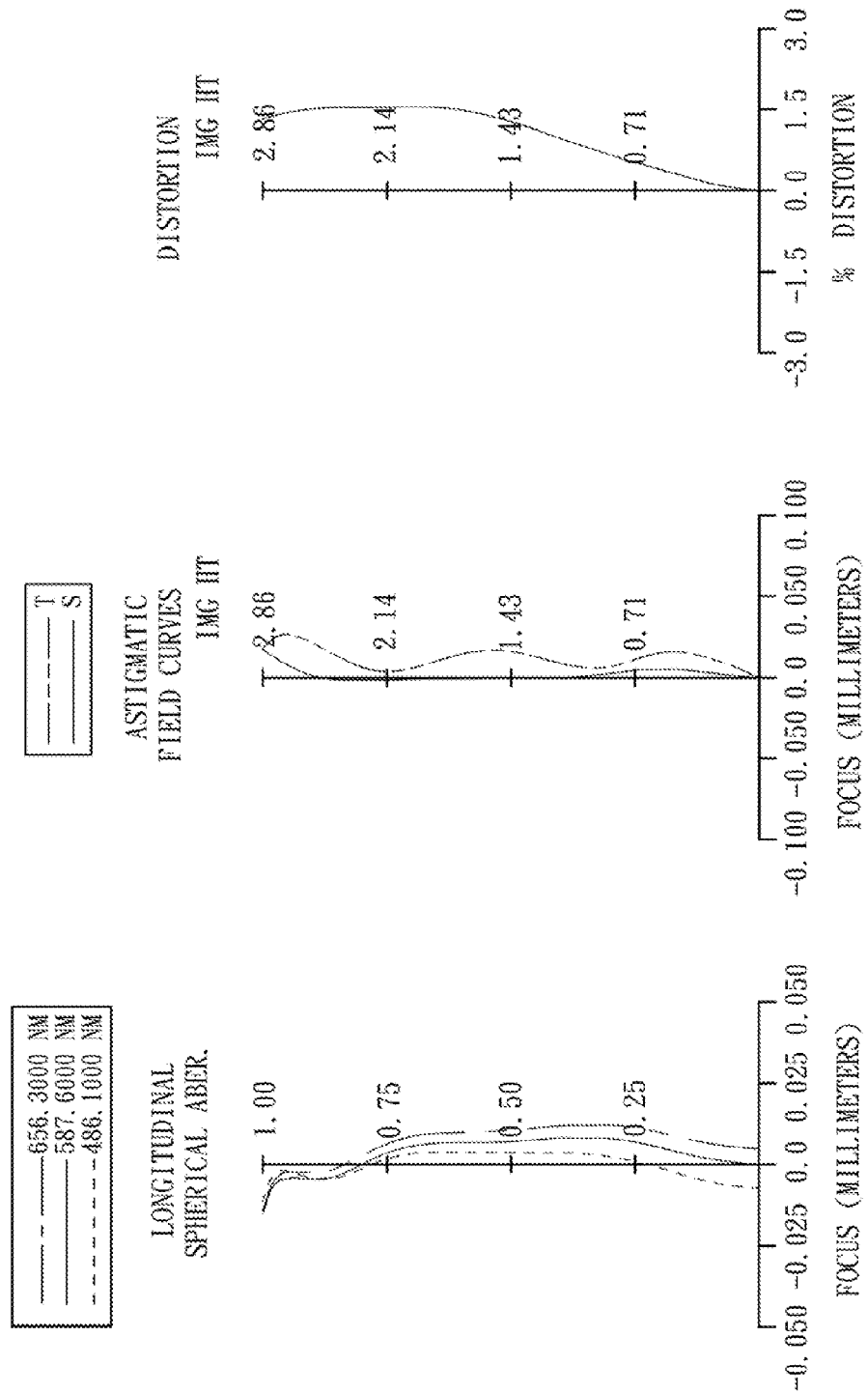
FIG. 18 shows spherical aberration curves, astigmatic field curves and a distortion curve of the photographing system according to the 9th embodiment.

FIG. 17 is a schematic view of a photographing system according to the 9th embodiment of the present disclosure. FIG. 18 shows spherical aberration curves, astigmatic field curves and a distortion curve of the photographing system according to the 9th embodiment. In FIG. 17, the photographing system includes, in order from an object side to an image side, an aperture stop 900, the first lens element 910, the second lens element 920, the third lens element 930, the fourth lens element 940, the fifth lens element 950, an IR-filter 970, an image plane 960 and an image sensor 980.

The first lens element 910 with positive refractive power has a convex object-side surface 911 and a concave image-side surface 912, and is made of plastic material. The object-side surface 911 and the image-side surface 912 of the first lens element 910 are aspheric.

The second lens element 920 with negative refractive power has a convex object-side surface 921 and a concave image-side surface 922, and is made of plastic material. The object-side surface 921 and the image-side surface 922 of the second lens element 920 are aspheric.

The third lens element 930 with positive refractive power has a convex object-side surface 931 and a convex image-side surface 932, and is made of plastic material. The object-side surface 931 and the image-side surface 932 of the third lens element 930 are aspheric.

The fourth lens element 940 with negative refractive power has a concave object-side surface 941 and a convex image-side surface 942, and is made of plastic material. The object-side surface 941 and the image-side surface 942 of the fourth lens element 940 are aspheric.

The fifth lens element 950 with positive refractive power has a convex object-side surface 951 and a concave image-side surface 952, and is made of plastic material. The object-side surface 951 and the image-side surface 952 of the fifth lens element 950 are aspheric. Furthermore, the fifth lens element 950 has inflection points formed on the object-side surface 951 and the image-side surface 952 thereof.

The IR-filter 970 is made of glass and located between the fifth lens element 950 and the image plane 960, and will not affect the focal length of the photographing system.

The detailed optical data of the 9th embodiment are shown in Table 17 and the aspheric surface data are shown in Table 18 below.

TABLE 17

9th Embodiment
f = 4.12 mm, Fno = 2.46, HFOV = 34.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.230 | | | | |
| 2 | Lens 1 | 1.427800 (ASP) | 0.528 | Plastic | 1.544 | 55.9 | 2.98 |
| 3 | | 10.446500 (ASP) | 0.122 | | | | |
| 4 | Lens 2 | 6.365100 (ASP) | 0.245 | Plastic | 1.640 | 23.3 | −5.08 |
| 5 | | 2.120150 (ASP) | 0.331 | | | | |
| 6 | Lens 3 | 16.734200 (ASP) | 0.281 | Plastic | 1.544 | 55.9 | 7.62 |
| 7 | | −5.475800 (ASP) | 0.463 | | | | |
| 8 | Lens 4 | −0.807110 (ASP) | 0.296 | Plastic | 1.640 | 23.3 | −14.83 |
| 9 | | −1.008390 (ASP) | 0.126 | | | | |
| 10 | Lens 5 | 2.280360 (ASP) | 0.895 | Plastic | 1.544 | 55.9 | 833.28 |
| 11 | | 1.974900 (ASP) | 0.600 | | | | |

TABLE 17-continued

9th Embodiment
f = 4.12 mm, Fno = 2.46, HFOV = 34.4 deg.

| Surface # | | Curvature Radius | Thickness | Material | Index | Abbe # | Focal length |
|---|---|---|---|---|---|---|---|
| 12 | IR-Filter | Plano | 0.300 | Glass | 1.517 | 64.2 | — |
| 13 | | Plano | 0.614 | | | | |
| 14 | Image | Plano | — | | | | |

Note:
Reference wavelength (d-line) is 587.6 nm.

TABLE 18

Aspheric Coefficients

| Surface # | | | | | |
|---|---|---|---|---|---|
| | 2 | 3 | 4 | 5 | 6 |
| k = | −7.33966E−02 | 1.43813E+01 | −4.16987E+01 | −4.95665E+00 | −7.56432E+01 |
| A4 = | 7.99575E−04 | −1.12178E−01 | −2.38832E−01 | −1.35025E−01 | −1.34166E−01 |
| A6 = | 3.73615E−02 | 2.03321E−01 | 5.21630E−01 | 4.33015E−01 | −1.10641E−01 |
| A8 = | −1.29928E−01 | −2.24148E−01 | −5.11807E−01 | −3.66398E−01 | 2.05193E−01 |
| A10 = | 2.01181E−01 | 2.21329E−02 | 1.30950E−01 | 1.53048E−01 | −4.43300E−02 |
| A12 = | −1.22336E−01 | −1.43616E−02 | −3.64890E−02 | −7.20635E−02 | −2.38203E−01 |
| A14 = | −4.05439E−02 | −7.39386E−04 | 9.82225E−02 | 1.36283E−01 | 3.99472E−01 |
| A16 = | | | | | −1.85724E−01 |

| Surface # | | | | | |
|---|---|---|---|---|---|
| | 7 | 8 | 9 | 10 | 11 |
| k = | −1.00000E+02 | −3.11431E+00 | −6.73728E−01 | −2.32157E+01 | −1.19967E+01 |
| A4 = | −1.03734E−01 | 4.12233E−02 | 1.81300E−01 | −1.49956E−01 | −7.79433E−02 |
| A6 = | −6.55337E−02 | −3.35428E−01 | −1.35208E−01 | 4.88948E−02 | 2.31545E−02 |
| A8 = | 8.44413E−02 | 4.73909E−01 | 6.91017E−02 | −1.21224E−02 | −7.76169E−03 |
| A10 = | 4.08417E−02 | −1.68392E−01 | 6.31446E−02 | 2.14630E−03 | 1.68707E−03 |
| A12 = | 1.61780E−02 | −3.92614E−03 | −1.63899E−02 | 5.28368E−04 | −2.14977E−04 |
| A14 = | −2.66998E−02 | −5.61610E−03 | −2.68851E−02 | −2.36927E−04 | 1.03030E−05 |
| A16 = | | 9.04406E−04 | 9.46199E−03 | 1.68848E−05 | |

In the photographing system according to the 9th embodiment, the definitions of f, Fno, HFOV, V3, V4, CT4, CT5, R1, R2, R5, R6, R7, f3, f4, f5, Td, TTL and ImgH are the same as those stated in the 1st embodiment with corresponding values for the 9th embodiment. Moreover, these parameters can be calculated from Table 17 and Table 18 as the following values and satisfy the following relationships:

| | |
|---|---|
| f (mm) | 4.12 |
| Fno | 2.46 |
| HFOV (deg.) | 34.4 |
| V3 − V4 | 32.6 |
| CT5/CT4 | 3.02 |
| (R1 + R2)/(R1 − R2) | −1.32 |
| R5/R6 | −3.06 |
| R7/f | −0.20 |
| f/f3 + |f/f4| + |f/f5| | 0.82 |
| Td/CT5 | 3.67 |
| TTL/ImgH | 1.65 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A photographing system comprising, in order from an object side to an image side:
a first lens element with positive refractive power having a convex object-side surface;
a second lens element with negative refractive power;
a third lens element with positive refractive power made of plastic material and having a convex object-side surface and a convex image-side surface, wherein the object-side surface and the image-side surface of the third lens element are aspheric;
a fourth lens element with negative refractive power made of plastic material and having a concave object-side surface and a convex image-side surface, wherein the object-side surface and the image-side surface of the fourth lens element are aspheric; and
a fifth lens element with refractive power made of plastic material and having a concave image-side surface, wherein an object-side surface and the image-side surface of the fifth lens element are aspheric, and the fifth lens element has at least one inflection point formed on at least one of the object-side surface and the image-side surface thereof;
wherein a curvature radius of the object-side surface of the third lens element is R5, a curvature radius of the image-side surface of the third lens element is R6, an axial distance between the object-side surface of the first lens element and the image-side surface of the fifth lens element is Td, and a central thickness of the fifth lens element is CT5, the following relationships are satisfied:

$-4.5 < R5/R6 < -1.0$; and $2.0 < Td/CT5 < 4.4$.

2. The photographing system of claim 1, wherein the fifth lens element has a convex object-side surface.

3. The photographing system of claim 1, wherein a curvature radius of the object-side surface of the fourth lens element is R7, and a focal length of the photographing system is f, the following relationship is satisfied:

$-0.5 < R7/f < 0$.

4. The photographing system of claim 2, wherein a central thickness of the fourth lens element is CT4, and the central thickness of the fifth lens element is CT5, the following relationship is satisfied:

$2.4 < CT5/CT4 < 4.5$.

5. The photographing system of claim 2, wherein an Abbe number of the third lens element is V3, and an Abbe number of the fourth lens element is V4, the following relationship is satisfied:

$30 < V3 - V4 < 45$.

6. The photographing system of claim 2, wherein a focal length of the photographing system is f, a focal length of the third lens element is f3, a focal length of the fourth lens element is f4, and a focal length of the fifth lens element is f5, the following relationship is satisfied:

$0.5 < f/f3 + |f/f4| < |f/f5| < 1.6$.

7. The photographing system of wherein a curvature radius of the object-side surface of the first lens element is R1 and a curvature radius of an image-side surface of the first lens element is R2, the following relationship is satisfied:

$-3.0 < (R1+R2)/(R1-R2) < -0.7$.

8. The photographing system of claim 3, wherein the curvature radius of the object-side surface of the third lens element is R5, and the curvature radius of the image-side surface of the third lens element is R6, the following relationship is satisfied:

$-3.5 < R5/R6 < -1.3$.

9. The photographing system of claim 2, wherein an axial distance between the object-side surface of the first lens element d an image plane is TTL, and a maximum image height of the photographing system is ImgH, the following relationship is satisfied:

$TTL/ImgH < 1.80$.

10. A photographing system comprising, in order from an object side to an image side:
a first lens element with positive refractive power having a convex object-side surface;
a second lens element with negative refractive power;
a third lens element with positive refractive power made of plastic material and having a convex object-side surface and a convex image-side surface, wherein the object-side surface and the image-side surface of the third lens element are aspheric;
a fourth lens element with negative refractive power made of plastic material and having a concave object-side surface and a convex image-side surface, wherein the object-side surface and the image-side surface of the fourth lens element are aspheric; and
a fifth lens element with refractive power made of plastic material having a concave image-side surface, wherein an object-side surface and the image-side surface of the fifth lens element are aspheric, and the fifth lens element has at least one inflection point formed on at least one of the object-side surface and the mage-side surface thereof;
wherein a curvature radius of the object-side surface of the third lens element is R5, a curvature radius of the image-side surface of the third lens element is R6, an Abbe number of the third lens element is V3, and an Abbe number of the fourth lens element is V4, the following relationships are satisfied:

$-5.5 < R5/R6 < 0.0$; and $30 < V3 - V4 < 45$.

11. The photographing system of claim 10, wherein the fifth lens element has a convex object-side surface.

12. The photographing system of claim 10, wherein a curvature radius of the object-side surface of the fourth lens element is R7, and a fecal length of the photographing system is f, the following relationship is satisfied:

$-0.5 < R7/f < 0$.

13. The photographing system of claim 10, wherein a central thickness of the fourth lens element is CT4, and a central thickness of the fifth lens element is CT5, the following relationship is satisfied:

$2.4 < CT5/CT4 < 4.5$.

14. The photographing system of claim 10, wherein a focal length of the photographing system is f, a focal length of the third lens element is f3, a focal length of the fourth lens element is f4, and a focal length of the fifth lens element is f5, the following relationship is satisfied:

$0.5 < f/f3 \pm |f/f4| + |f/f5| < 1.6$.

15. The photographing system of claim 10, wherein the curvature radius of the object-side surface of the third lens element is R5, and the curvature radius of the image-side surface of the third lens element is R6, the following relationship is satisfied:

$-4.5 < R5/R6 < -1.0$.

16. The photographing system of claim 15, wherein the curvature radius of the object-side surface of the third lens element is R5, and the curvature radius of the image-side surface of the third lens element is R6, the following relationship is satisfied:

$-3.5 < R5/R6 < -1.3$.

17. The photographing system of claim 10, wherein an axial distance between the object-side surface of the first lens element d an image plane is TTL, and a maximum image height of the photographing system is ImgH, the following relationship is satisfied:

$TTL/ImgH < 1.80$.

* * * * *

UNITED STATES PATENT AND TRADEMARK OFFICE
CERTIFICATE OF CORRECTION

PATENT NO.           : 8,786,962 B2
APPLICATION NO.      : 13/593490
DATED                : July 22, 2014
INVENTOR(S)          : Chen et al.

It is certified that error appears in the above-identified patent and that said Letters Patent is hereby corrected as shown below:

In the Claims

Column 31, line 33, Claim 7 delete "The photographing system of wherein...",
and insert --The photographing system of claim 3, wherein...--.
Column 31, line 48, Claim 9 delete "... d an image plane is TTL,...",
and insert --... and an image plane is TTL,...--.
Column 32, line 9, Claim 10 delete "...the object-side surface and the mage-side surface...", and insert --...the object-side surface and the image-side surface...--.
Column 32, line 25, Claim 12 delete "...a fecal length of the photographing system...",
and insert --...a focal length of the photographing system...--.
Column 32, line 40, Claim 14 delete "$0.5 < f/f3 \pm |f/f4| + |f/f5| < 1.6.$",
and insert --$0.5 < f/f3 + |f/f4| + |f/f5| < 1.6.$--.
Column 32, line 58, Claim 17 delete "... d an image plane is TTL,...",
and insert --... and an image plane is TTL,...--.

Signed and Sealed this
Twenty-first Day of October, 2014

Michelle K. Lee
*Deputy Director of the United States Patent and Trademark Office*